(12) United States Patent
Akiyama et al.

(10) Patent No.: US 8,121,492 B2
(45) Date of Patent: Feb. 21, 2012

(54) OPTICAL TRANSMITTING APPARATUS

(75) Inventors: Yuichi Akiyama, Kawasaki (JP); Hideyuki Miyata, Kawasaki (JP); Noriaki Mizuguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 522 days.

(21) Appl. No.: 12/318,597

(22) Filed: Dec. 31, 2008

(65) Prior Publication Data

US 2009/0269080 A1 Oct. 29, 2009

(30) Foreign Application Priority Data

Apr. 18, 2008 (JP) ................. 2008-109327

(51) Int. Cl.
*H04B 10/04* (2006.01)
*H04B 10/12* (2006.01)

(52) U.S. Cl. .................. 398/188; 398/182; 398/186

(58) Field of Classification Search ............ None
See application file for complete search history.

(56) References Cited

U.S. PATENT DOCUMENTS

| | | | |
|---|---|---|---|
| 6,334,004 B1 * | 12/2001 | Ohkuma et al. ............. | 385/2 |
| 2006/0263097 A1 * | 11/2006 | Akiyama et al. ............ | 398/188 |
| 2006/0263098 A1 * | 11/2006 | Akiyama et al. ............ | 398/188 |
| 2007/0230617 A1 * | 10/2007 | Tao et al. .................... | 375/302 |
| 2008/0080872 A1 * | 4/2008 | Tanaka et al. ............... | 398/186 |

FOREIGN PATENT DOCUMENTS

| JP | 2000-180804 | 6/2000 |
|---|---|---|
| JP | 2007-82094 | 3/2007 |

\* cited by examiner

*Primary Examiner* — Kenneth N Vanderpuye
*Assistant Examiner* — Abbas H Alagheband
(74) *Attorney, Agent, or Firm* — Staas & Halsey LLP

(57) ABSTRACT

An optical transmitting apparatus includes a modulating unit that branches an input light and performs independent phase modulation to branched optical signals of arms, a phase adjusting unit that changes a phase difference between the optical signals of respective arms according to a control signal, a combining unit that combines modulated lights having the phase difference, an acquiring unit that acquires a positive-phase signal and a negative-phase signal from the combining unit, a subtracting unit that obtains a difference between the positive-phase signal and the negative-phase signal acquired by the acquiring unit, a detecting unit detecting a power of a differential signal from subtraction by the subtracting unit, and a control unit that changes the control signal according to signal component intensity detected by the detecting unit.

10 Claims, 26 Drawing Sheets

OPTICAL TRANSMITTING APPARATUS

CROSS-REFERENCE TO RELATED APPLICATIONS

This application is based upon and claims the benefit of priority from the prior Japanese Patent Application No. 2008-109327, filed on Apr. 18, 2008, the entire contents of which are incorporated herein by reference.

BACKGROUND

1. Field

The disclosure relates to an optical transmitting apparatus that modulates light and a control method of the optical transmitting apparatus.

2. Description of the Related Art

Toward a higher capacity and a longer distance of an optical transmission system, evaluation is being made of various modulation systems for transmission of an optical signal. Research and development are being made of the optical transmission systems using various phase modulation systems such as a CSRZ (Carrier Suppressed RZ) modulation system, an optical duobinary modulation system, a DPSK (Differential Phase Shift Keying) system, a SSB (Single Side Band) modulation system, and a DQPSK (Differential Quadrature PSK) system as well as an NRZ (Non Return to Zero) modulation system and an RZ. (Return to Zero) modulation system that are so far applied to products.

In a transmitting unit of the optical transmission systems using these modulation systems, a stabilizing technology for constituent components such as a modulator is essential to stabilization of an optical transmission signal. For example, an ABC (Auto Bias Control) circuit for preventing deterioration of a transmission signal due to a drift of an LN modulator in the NRZ modulation system may be cited as such a technology.

A multilevel phase modulation system such as the SSB modulation system and the DQPSK system is required to perform a phase shift control that is not required for the NRZ modulation system. Specifically, by shifting a relative phase of respective lights of an I arm and a Q arm of a modulating unit, a phase difference between the respective lights must be adjusted to $n\pi/2$ (n is an arbitrary odd number) (see, e.g., Japanese Patent Application Laid-Open Publication No. 2007-82094). For example, a low-frequency signal is superimposed over a control signal supplied to a phase shift unit and synchronous detection is performed based on a low-frequency component of an output light of an optical transmitting apparatus.

However, the above conventional technology has problems of a low sensitivity of a monitoring signal and lowering of control stability, depending on characteristics of constituent components such as an output power of an LD, a loss of the modulator, and a light-receiving sensitivity of a monitoring photodetector.

The above conventional technology causes variations in rising and falling characteristics of a data signal, depending on a driver that inputs the data signal for modulation to a light modulator. If the rising and the falling of the data signal are not steep, there is a problem that control accuracy is decreased due to lowering of the monitoring signal sensitivity to a deviation of a phase difference between arms.

SUMMARY

It is an object of the present invention to at least solve the above problems in the conventional technologies.

An optical transmitting apparatus according to one aspect of the invention includes: a modulating unit that branches an input light and performs independent phase modulation to branched optical signals of arms; a phase adjusting unit that changes a phase difference between the optical signals of respective arms according to a control signal; a combining unit that combines modulated lights having the phase difference; an acquiring unit that acquires a positive-phase signal and a negative-phase signal from the combining unit; a subtracting unit that obtains a difference between the positive-phase signal and the negative-phase signal acquired by the acquiring unit; a detecting unit detecting a power of a differential signal from subtraction by the subtracting unit; and a control unit that changes the control signal according to signal component intensity detected by the detecting unit.

An optical transmitting apparatus according to one aspect of the invention includes: a modulating unit that branches an input light and performs independent phase modulation to branched optical signals of arms; a phase adjusting unit that changes a phase difference between the optical signals of respective arms according to a control signal; a combining unit that combines modulated lights having the phase difference; an acquiring unit that acquires a positive-phase signal and a negative-phase signal from the combining unit; a multiplying unit that obtains a product of the positive-phase signal and the negative-phase signal acquired by the acquiring unit; a detecting unit detecting a power of a product signal resultant from multiplication by the multiplying unit; and a control unit that changes the control signal according to signal component intensity detected by the detecting unit.

A control method of an optical transmitting apparatus according to one aspect of the invention includes: branching an input light and performing independent phase modulation to branched optical signals of arms; changing a phase difference between the optical signals of respective arms according to a control signal; combining modulated lights having the phase difference; acquiring a positive-phase signal and a negative-phase signal; obtaining a difference between the positive-phase signal and the negative-phase signal; detecting a power of a differential signal resultant from subtraction; and changing the control signal according to signal component power detected by the detecting unit.

The other objects, features, and advantages of the present invention are specifically set forth in or will become apparent from the following detailed description of the invention when read in conjunction with accompanying drawings.

DETAILED DESCRIPTION OF THE PREFERRED EMBODIMENTS

Referring to the accompanying drawings, exemplary embodiments according to the present invention are explained in detail below.

Figure 1:
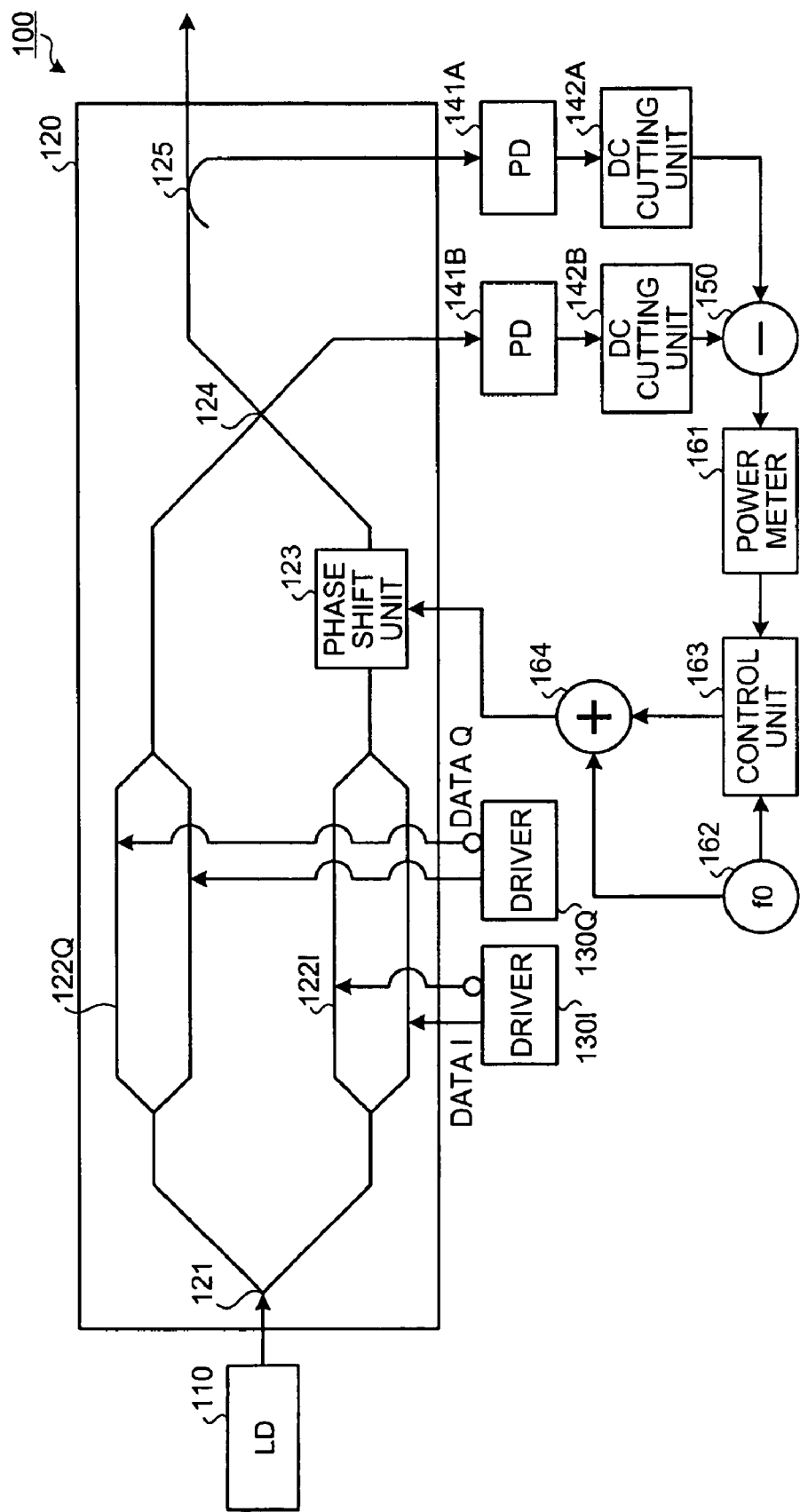
FIG. 1 is a block diagram of a functional configuration of an optical transmitting apparatus according to a first embodiment.

FIG. 1 is a block diagram of a functional configuration of an optical transmitting apparatus according to a first embodiment. As depicted in FIG. 1, the optical transmitting apparatus 100 according to the first embodiment comprises a light source 110, an LN modulator 120, a driver 130I, a driver 130Q, a light receiving unit 141A, a light receiving unit 141B, a DC cutting unit 142A, a DC cutting unit 142B, a subtracting circuit 150, a power meter 161, an oscillator circuit 162, a control unit 163, and an adding circuit 164.

The light source 110 generates a continuous light and outputs the continuous light to the LN modulator 120. Here, the light source 110 is a laser diode (LD). The LN modulator 120 is a modulator that performs DQPSK-system modulation, including a phase adjusting unit that gives a phase difference corresponding to a supplied control signal (bias) to optical signals of respective arms.

The LN modulator 120 comprises a branching unit 121, a phase modulating unit 122I, a phase modulating unit 122Q, a phase shift unit 123, a combining unit 124, and a branching unit 125. The LN modulator 120 is a DQPSK modulator with an optical waveguide provided on an LN (LiNbO3) substrate having an electro-optical effect and with electrodes arranged along the optical waveguide on the surface of the LN substrate.

The branching unit 121 is an optical waveguide that branches the continuous light output from the light source 110 and outputs respective branched lights to the phase modulating unit 122I and the phase modulating unit 122Q. In the following description, paths of a pair of lights branched by the branching unit 121 are referred to as an I arm and a Q arm, respectively. The phase modulating unit 122I and the phase shift unit 123 are provided on the I arm and the phase modulating unit 122Q is provided on the Q arm.

The phase modulating unit 122I is a Mach-Zehnder modulator that phase-modulates the continuous light output from the branching unit 121 according to Data I supplied from the driver 130I. Specifically, the phase modulating unit 122I applies the phase modulation to respective continuous lights passing through arms according to a non-inverted signal and an inverted signal output from the driver 130I. The phase modulating unit 122I outputs the phase-modulated signal to the phase shift unit 123.

The phase modulating unit 122Q is a Mach-Zehnder modulator that phase-modulates the continuous light output from the branching unit 121 according to Data Q supplied from the driver 130Q. Specifically, the phase modulating unit 122Q applies the phase modulation to respective continuous lights passing through arms according to the non-inverted signal and the inverted signal output from the driver 130Q. The phase modulating unit 122Q outputs the phase-modulated signal to the combining unit 124.

The phase shift unit 123 sets a relative phase difference of $n\pi/2$ (n is an arbitrary odd number) for the lights propagating through the phase modulating units 122I and 122Q and the amount of the phase difference changes according to the control signal output from the adding circuit 164. The phase shift unit 123 includes, for example, an optical waveguide provided on the LN substrate of the LN modulator 120 and electrodes arranged along the optical waveguide on the LN substrate, the control signal output from the adding circuit 164 being input to the electrodes.

Respective lights provided with the phase difference of $n\pi/2$ (n is an arbitrary odd number) by the phase shift unit 123 are input to the combining unit 124 using, for example, multi-mode interference (MMI).

The combining unit 124 includes input ports corresponding to respective arms and respective output ports that, after generation of a DQPSK signal light by combining optical signals given to respective input ports, output a positive-phase signal and a negative-phase signal of interfering lights. The positive-phase signal is a signal output from the combining unit 124 and is defined as a signal output to an external device. The negative-phase signal is a signal output from the combining unit 124 and is defined as a signal different from the positive-phase signal.

The combining unit 124 outputs the positive-phase signal to the branching unit 125. The combining unit 124 outputs the negative-phase signal to the light-receiving unit 141B. The branching unit 125 is an optical waveguide for branching the positive-phase signal output from the combining unit 124. The branching unit 125 outputs the branched positive-phase signals to the outside of the optical transmitting apparatus 100 and the light receiving unit 141A, respectively.

The driver 130I outputs the non-inverted signal of the Data I to one arm of the phase modulating unit 122I and the inverted signal of the Data I to the other arm of the phase modulating unit 122I. The driver 130Q outputs the non-inverted signal of the Data Q to one arm of the phase modulating unit 122Q and the inverted signal of the Data Q to the other arm of the phase modulating unit 122Q. Each of the Data I and the Data Q is a binary data input from the outside of the optical transmitting apparatus 100.

The light receiving unit 141A receives the positive-phase signal output from the branching unit 125. The light receiving unit 141A converts the received positive-phase signal to an electrical signal and outputs the electrical signal to the DC cutting unit 142A. The light receiving unit 141B receives the negative-phase signal output from the combining unit 124. The light receiving unit 141B converts the received negative-phase signal to an electrical signal and outputs the electrical signal to the DC cutting unit 142B. Each of the light receiving unit 141A and the light receiving unit 141B is, for example, a photodiode (PD).

The DC cutting unit 142A removes a DC component from the positive-phase signal output from the light receiving unit 141A and outputs the signal to the subtracting circuit 150. The DC cutting unit 142B removes the DC component from the negative-phase signal output from the light receiving unit 141B and outputs the signal to the subtracting circuit 150. Each of the DC cutting unit 142A and the DC cutting unit 142B is, for example, a capacitor.

The subtracting circuit 150 calculates a difference between the positive-phase signal output from the DC cutting unit 142A and the negative-phase signal output from the DC cutting unit 142B. The subtracting circuit 150 outputs a differential signal resultant from the calculation to the power meter 161. The power meter 161 (e.g., power detector) outputs a signal indicative of the power of the differential signal output from the subtracting circuit 150 to the control unit 163.

The oscillator circuit 162 oscillates a low-frequency signal of a low frequency. The low-frequency signal oscillated by the oscillator circuit 162 is a clock signal of a sufficiently low frequency f0 (e.g., several kHz) relative to the modulating frequency (e.g., 20 GHz) in, for example, the phase modulating unit 122I. The oscillator circuit 162 outputs the oscillated low-frequency signal to the control unit 163 and the adding circuit 164.

The control unit 163 performs synchronous detection based on the signal output from the power meter 161 and the low-frequency signal output from the oscillator circuit 162. Specifically, the control unit 163 compares the signal output from the power meter 161 and the low-frequency signal output from the oscillator circuit 162 and performs control so that the phase shift amount of the phase shift unit 123 of the LN modulator 120 comes to an optimum point.

The control unit 163 outputs a control signal to the adding circuit 164, based on variation of a low-frequency signal component in the power meter output signal as detected by the synchronous detection. Specifically, the control unit 163 controls the control signal output to the adding circuit 164 so that the phase difference between the I arm and the Q arm becomes π/2. The adding circuit 164 adds (superimpose) the low-frequency signal output from the oscillator circuit 162 to (over) the control signal output from the control unit 163 and outputs the added (superimposed) signal to the phase shift unit 123.

While the configuration has been described where a phase shift unit (phase shift unit 123) is provided only for the I arm of the LN modulator 120, the phase shift unit may be provided for both of the I arm and the Q arm. In such a case, the phase difference between lights in respective arms is controlled by performing a relative control of respective control signals output to the respective phase shift units.

While the configuration has been described where the DC cutting unit 142A and the DC cutting unit 142B are provided, the DC cutting units 142A and 142B may be removed. When the DC cutting units 142A and 142B are not provided, the light receiving unit 141A and the light receiving unit 141B output the positive-phase signal and the negative-phase signal, respectively, to the subtracting circuit 150.

Figure 2:
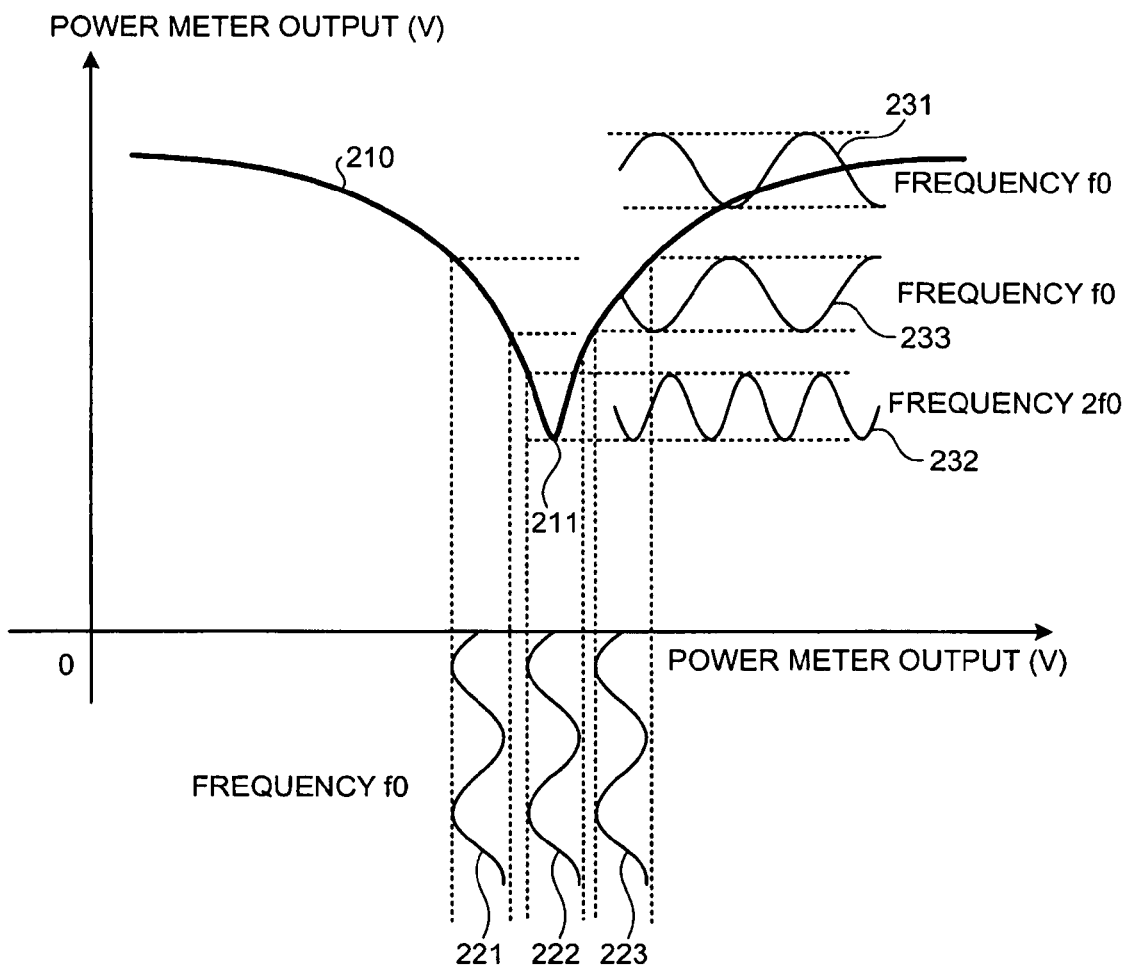
FIG. 2 is a graph depicting the change of the power meter output voltage versus the control signal voltage applied to the phase shift unit depicted in FIG. 1 and the change of the low frequency monitoring signal at respective control signal voltages.

FIG. 2 is a graph depicting the change of the power meter output voltage versus the control signal voltage applied to the phase shift unit depicted in FIG. 1 and the change of the low frequency monitoring signal at respective control signal voltages. In FIG. 2, the horizontal axis represents voltage (V) of the control signal output from the control unit 163 to the adding circuit 164. The vertical axis represents voltage (V) of the signal (power meter output) output from the power meter 161 to the control unit 163. A solid line 210 represents a relationship between the voltage of the control signal along the horizontal axis and the voltage of the output of the power meter 161 along the vertical axis.

A point 211 on the solid line 210 indicates an optimum point of the control signal applied by the control unit 163 to the phase shift unit 123 and the voltage of the output of the power meter 161 when the control signal is at the optimum point. The optimum point of the control signal indicates the voltage of the control signal at which the phase difference between the lights in the respective arms in the LN modulator 120 becomes nπ/2 (n is an arbitrary odd number).

As depicted by the solid line 210 and the point 211, when the control signal is at the optimum point, the voltage of the output of the power meter 161 comes to a minimum. A waveform 221 indicates a waveform of the control signal output from the adding circuit 164 to the phase shift unit 123 when the control signal output from the control unit 163 to the adding circuit 164 deviates in a minus direction from the optimum point.

A waveform 222 indicates the waveform of the control signal output from the adding circuit 164 to the phase shift unit 123 when the control signal output from the control unit 163 is at the optimum point. A waveform 223 indicates the waveform of the control signal output from the adding circuit 164 to the phase shift unit 123 when the control signal output from the control unit 163 deviates in a plus direction from the optimum point.

As depicted by the waveforms 221 to 223, the control signal output from the adding circuit 164 to the phase shift unit 123, to which the low-frequency signal of frequency f0 output from the oscillator circuit 162 has been added, changes with frequency f0. For example, the control signal of the waveform 222 changes with frequency f0, centered at the optimum point depicted by the point 211.

A waveform 231 indicates a waveform of the signal output from the power meter 161 to the control unit 163 when the control signal indicated by the waveform 221 is output to the phase shift unit 123. A waveform 232 indicates the waveform of the signal output from the power meter 161 to the control unit 163 when the control signal indicated by the waveform 222 is output to the phase shift unit 123.

A waveform 233 indicates the waveform of the signal output from the power meter 161 to the control unit 163 when the control signal indicated by the waveform 223 is output to the phase shift unit 123. As depicted by the waveform 231 and the waveform 233, when the control signal deviates from the optimum point, the signal output from the power meter 161 contains a signal component of frequency f0.

As depicted by the waveform 231 and the waveform 233, depending on in which direction the control signal deviates from the optimum point, the phase is reversed of the frequency f0 component of the signal output from the power meter 161. As depicted by the waveform 232, when the control signal does not deviate from the optimum point, the control signal changing with frequency f0 as depicted by the waveform 222 passes the point 211 twice in each cycle of the signal and accordingly, the signal output from the power meter 161 contains the signal component of frequency 2f0.

The control unit 163 monitors the f0 component of the signal output from the power meter 161 by the synchronous detection of the low-frequency signal of frequency f0 output from the oscillator circuit 162 and the signal output from the power meter 161. The control unit 163 is capable of determining the direction of deviation from the optimum point of the control signal by a polarity change of the synchronous detection output signal caused by a phase change of the f0 component of the signal output from the power meter 161.

Figure 3:
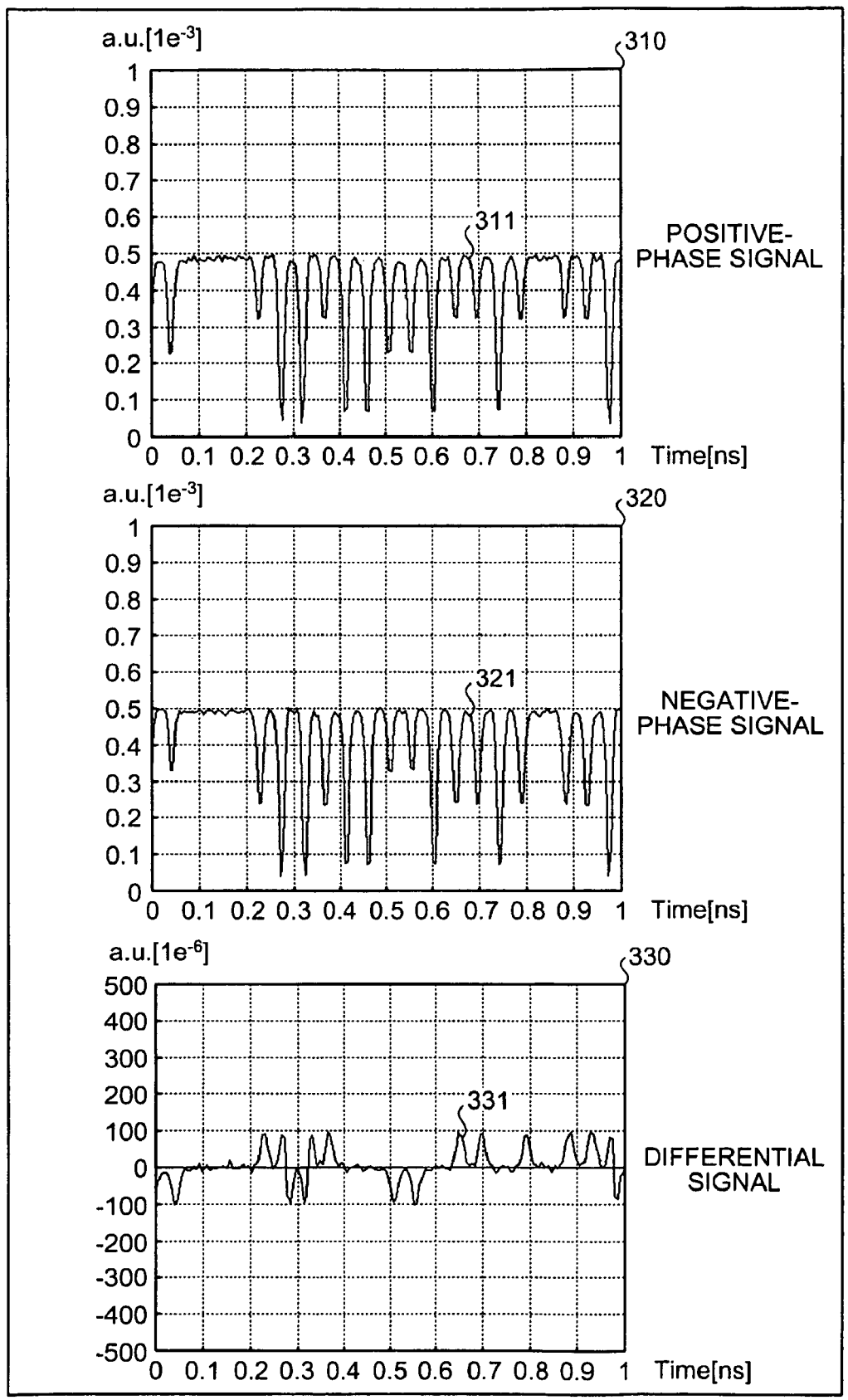
FIG. 3 is a waveform chart of signals when the phase difference is at the optimum point.

FIG. 3 is a waveform chart of signals when the phase difference is at the optimum point. In each of graphs 310, 320, and 330 of FIG. 3, the horizontal axis represents time (ns). In each of the graphs 310 and 320, the vertical axis represents power (a.u.) of the signal. In the graph 330, the vertical axis represents power (a.u.) of the signal (the same is applicable to FIGS. 4 and 5).

The waveforms of the graphs 310, 320, and 330 indicate respective signals when, with the control signal output by the control unit 163 coming to the optimum point, the phase difference between the arms of the LN modulator 120 is at the optimum point $n\pi/2$ (n is an arbitrary odd number). A waveform 311 of the graph 310 indicates the waveform of the positive-phase signal output from the combining unit 124 to the light receiving unit 141A.

A waveform 321 of the graph 320 indicates the waveform of the negative-phase signal output from the combining unit 124 to the light receiving unit 141B. A waveform 331 of the graph 330 indicates the waveform of the differential signal output from the subtracting circuit 150 to the power meter 161. The waveform 331 is obtained by subtracting the waveform 321 from the waveform 311.

When the phase difference between the arms is at the optimum point, the positive-phase signal and the negative-phase signal are of substantially identical waveform, as depicted by the waveform 311 and the waveform 321. Therefore, the differential signal depicted by the waveform 331 of the graph 330 is constant at nearly zero.

As depicted by the waveform 311 and the waveform 321, identical noise appears in the positive-phase signal and the negative-phase signal, but the subtraction of the negative-phase signal from the positive-phase signal eliminates the noise. For this reason, the control unit 163 is capable of monitoring the phase difference between the arms with higher accuracy, as compared with the case of monitoring either the positive-phase signal or the negative-phase signal.

Figure 4:
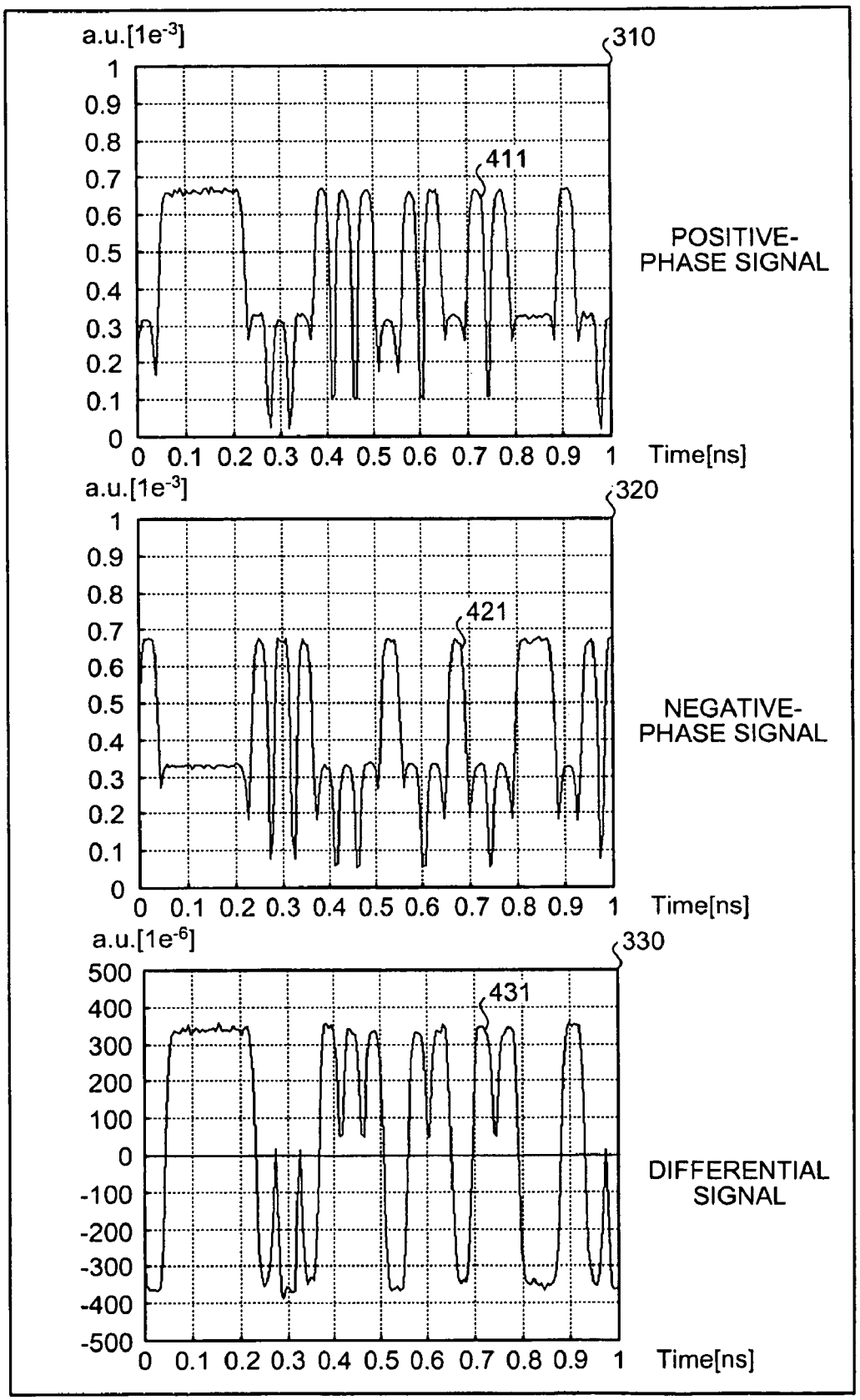
FIG. 4 is a waveform chart of signals when the phase difference deviates −20° from the optimum point.

FIG. 4 is a waveform chart of signals when the phase difference deviates −20° from the optimum point. In FIG. 4, with respect to the same part as depicted in FIG. 3, description thereof will be omitted, with the same reference numeral given thereto. The waveforms of the graphs 310, 320, and 330 of FIG. 4 indicate respective signals when, with the control signal output by the control unit 163 deviating in the minus direction from the optimum point, the phase difference between the arms of the LN modulator 120 deviates −20° from the optimum point.

When the phase difference between the arms deviates in the minus direction from the optimum point, a difference of power appears between bits as depicted by the waveform 411 and the waveform 421. In other words, the pulse height of each bit is not uniform. In the waveforms 311 and 321, the power of the bits is substantially equal and uniform.

The magnitudes of power of corresponding bits between the positive-phase and negative-phase signals change in opposite directions. Therefore, the amount of change of the differential signal for the deviation of the phase difference between the arms is about two times as much as the amount of change of the positive-phase signal and the negative-phase signal.

Figure 5:
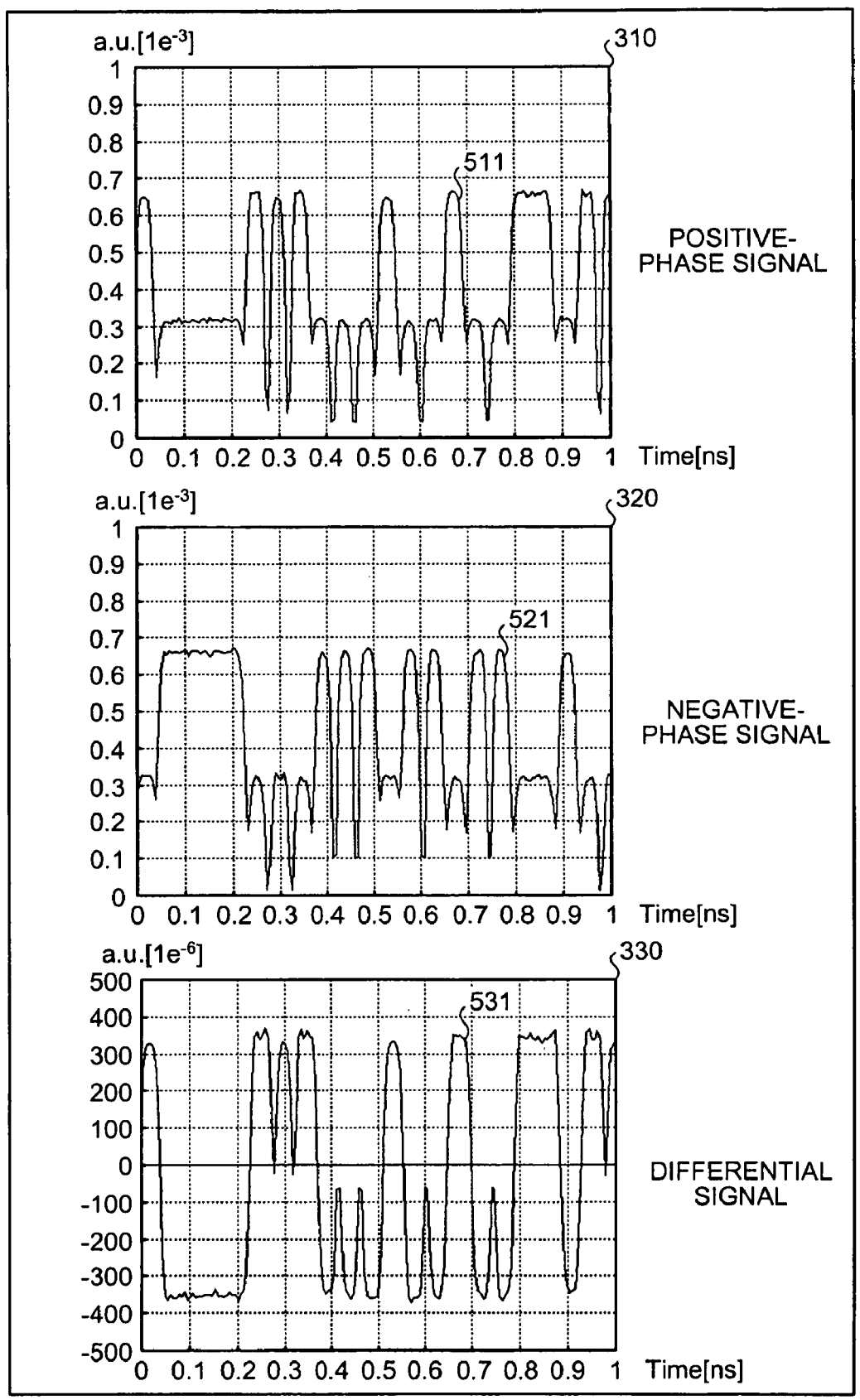
FIG. 5 is a waveform chart of signals when the phase difference deviates +20° from the optimum point.

FIG. 5 is a waveform chart of signals when the phase difference deviates +20° from the optimum point. In FIG. 5, with respect to the same part as depicted in FIG. 3, description thereof will be omitted, with the same reference numeral given thereto. The waveforms of the graphs 310, 320, and 330 of FIG. 5 indicate respective signals when, with the control signal output by the control unit 163 deviating in the plus direction from the optimum point, the phase difference between the arms of the LN modulator 120 deviates +20° from the optimum point.

When the phase difference between the arms deviates in the plus direction from the optimum point, a difference of power appears between bits as depicted by the waveform 511 and the waveform 521. The magnitudes of power of each corresponding bit between the positive-phase and negative phase signals change in opposite directions. Therefore, the amount of change of the differential signal for the deviation of the phase difference between the arms is about two times as much as the amount of change of the positive-phase signal and the negative-phase signal.

Figure 6:
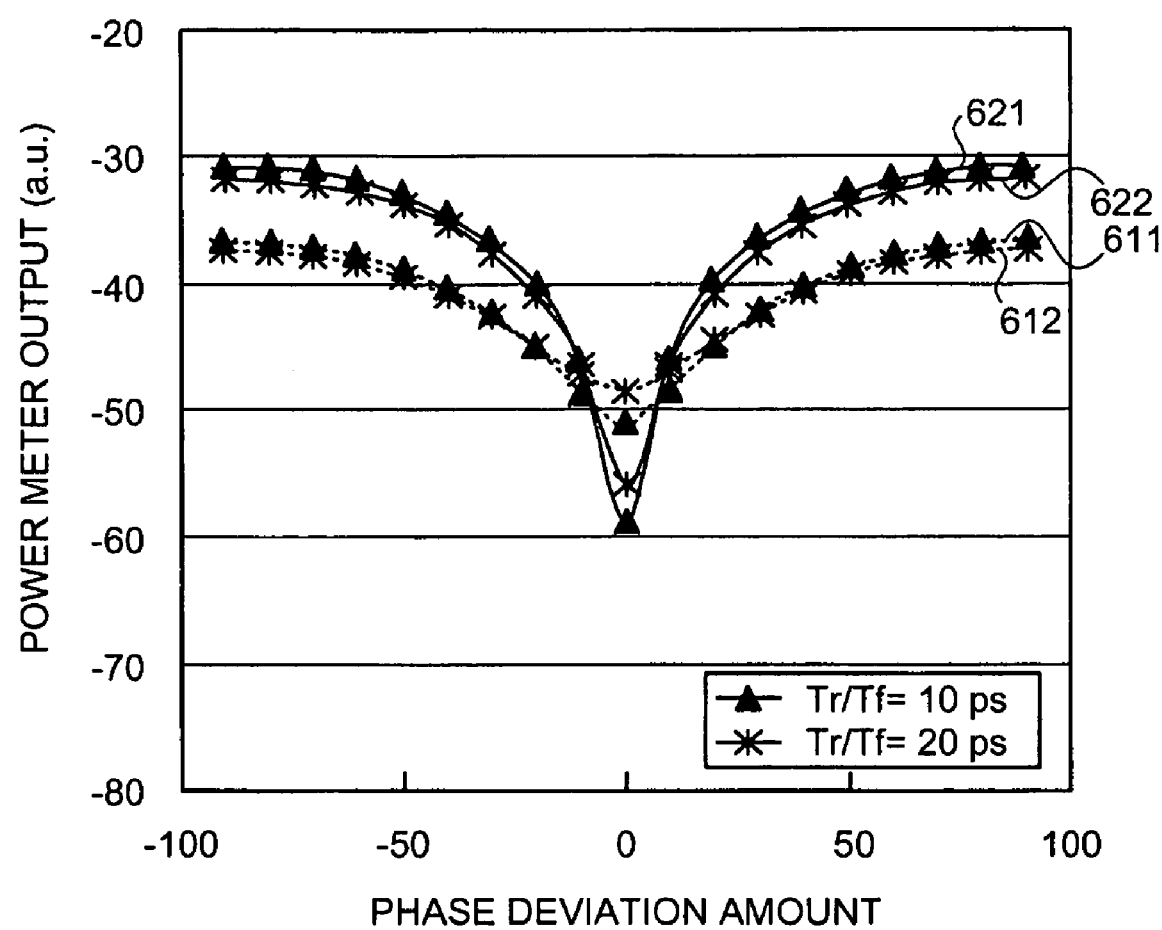
FIG. 6 is a graph of the output of the power meter depicted in FIG. 1.

FIG. 6 is a graph of the output of the power meter depicted in FIG. 1. In FIG. 6, the horizontal axis represents the amount of phase deviation from the optimum point $n\pi/2$ (n is an arbitrary odd number) of the phase difference between the arms. The vertical axis represents the power (a.u.) of the signal output from the power meter 161 to the control unit 163 (power meter output).

A dotted line 611 and a dotted line 612 indicate a relationship between the amount of phase deviation along the horizontal axis and the output of the power meter 161 along the vertical axis, in the case of the conventional optical transmitting apparatus. A solid line 621 and a solid line 622 indicate a relationship between the amount of phase deviation along the horizontal axis and the output of the power meter 161 along the vertical axis, in the case of the optical transmitting apparatus 100.

The dotted line 611 and the solid line 621 (triangle mark) indicate the case in which the rising and falling characteristic Tr/Tf of the Data I and Data Q output from the driver 130I and the driver 130Q, respectively, is 10 ps. The dotted line 612 and the solid line 622 (asterisk mark) indicate the case in which the characteristic Tr/Tf is 20 ps.

As depicted by the dotted lines 611 and 612 and the solid lines 621 and 622, the optical transmitting apparatus 100 is capable of sharpening the change of the signal output from the power meter 161 against the amount of phase deviation between the arms, as compared with the conventional optical transmitting apparatus and therefore, is capable of improving the amplitude of the frequency f0 signal used for detection of the control optimum point by the control unit 163 (the amplitude of the f0 signal occurring in the case of deviation from the optimum point depicted in FIG. 2), namely, improving control monitoring signal sensitivity at the control unit 163 more than two times, thereby performing detection with high accuracy.

Figure 7:
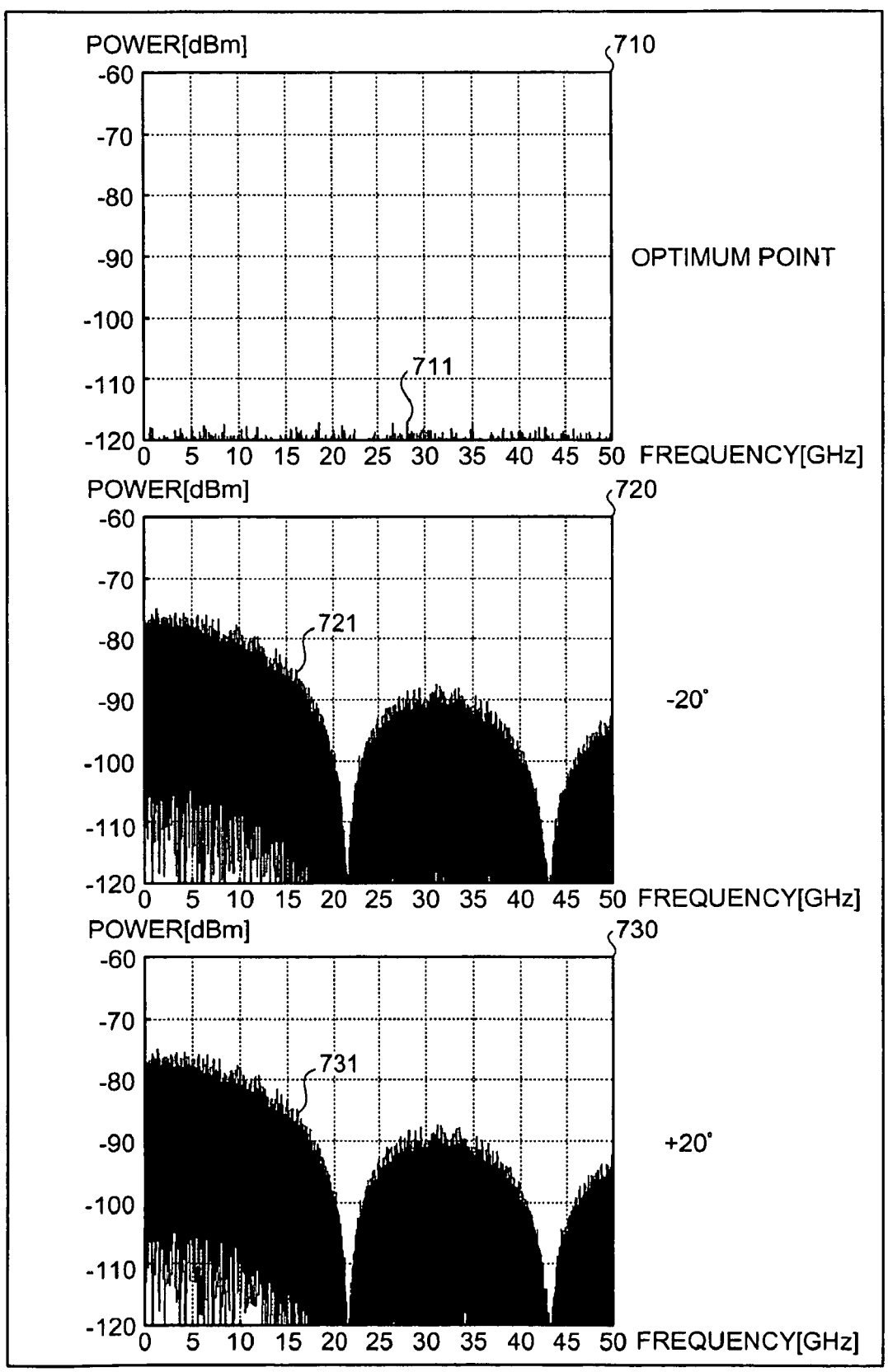
FIG. 7 is a group of graphs of spectrum of the differential signal output from the subtracting circuit.

FIG. 7 is a group of graphs of spectrum of the differential signal output from the subtracting circuit 150. In each graph of FIG. 7, the horizontal axis indicates a band (Frequency [GHz]) of the differential signal output from the subtracting circuit 150 and the vertical axis indicates the power (Power [dBm]) of the differential signal. The spectrum 711 of the graph 710 represents the spectrum of the differential signal output from the subtracting circuit 150 when the phase difference between the arms is at the optimum point.

The spectrum 721 of the graph 720 represents the spectrum of the differential signal output from the subtracting circuit 150 when the phase difference between the arms deviates −20° from the optimum point. The spectrum 731 of the graph 730 represents the spectrum of the differential signal output from the subtracting circuit 150 when the phase difference between the arms deviates +20° from the optimum point.

As depicted by the spectra 711, 721, and 731, when the phase difference between the arms deviates from the optimum point, power of the differential signal output from the subtracting circuit 150 changes over a wide band including a lower band. Therefore, even if the band at the control unit 163 is shifted to a sufficiently low band relative to the modulating speed of the optical signal, the deviation of the phase difference between the arms can be detected. The sufficiently low band relative to the modulating speed of the optical signal is, for example, around 100 MHz.

Figure 8:
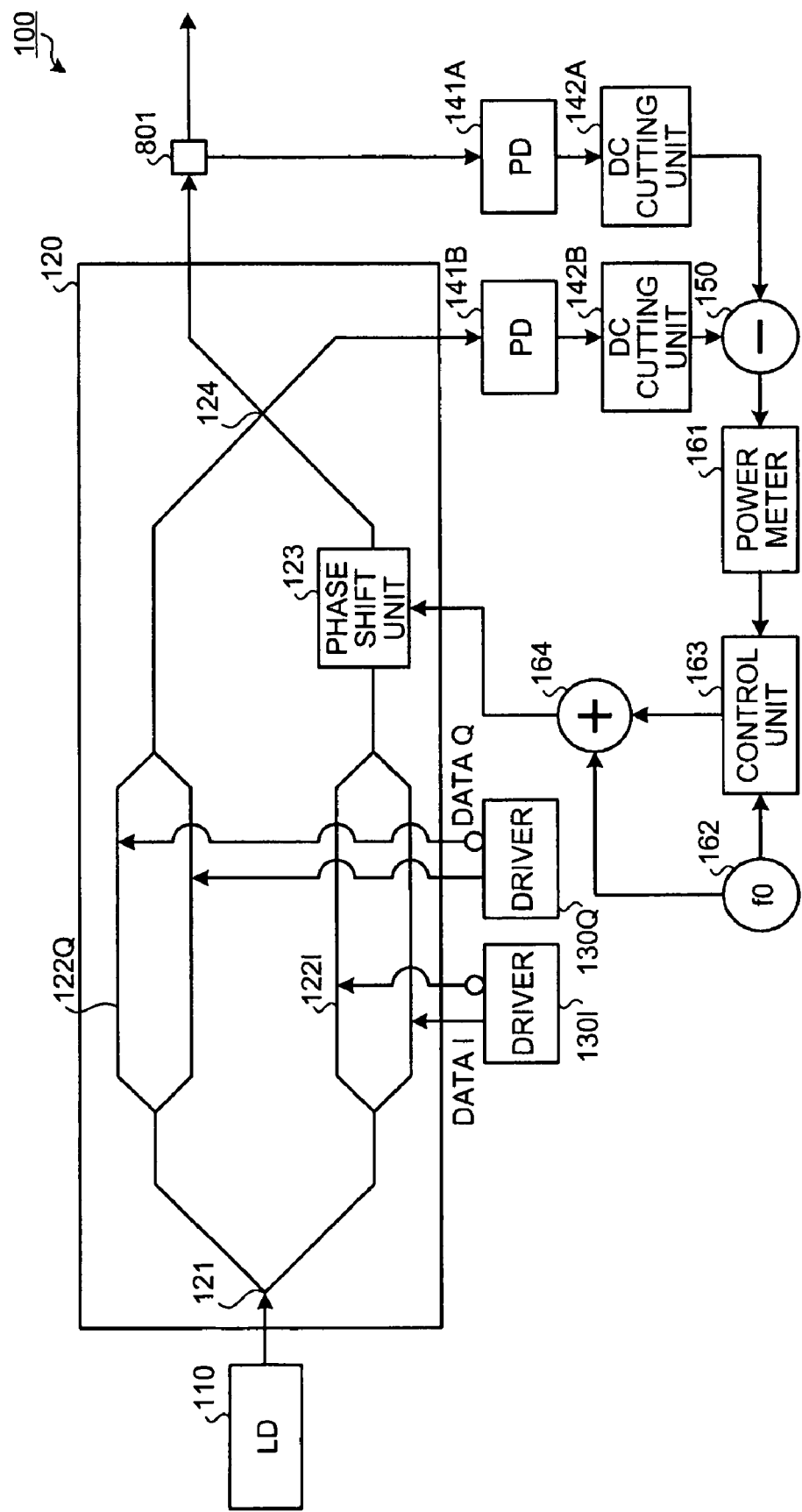
FIG. 8 is a block diagram of another example of the optical transmitting apparatus depicted in FIG. 1.

FIG. 8 is a block diagram of another example of the optical transmitting apparatus depicted in FIG. 1. In FIG. 8, with respect to the same configuration as depicted in FIG. 1, description thereof will be omitted, with the same reference numeral given thereto. While, in FIG. 1, the positive-phase signal output from the combining unit 124 is taken out by the branching unit 125, an optical waveguide provided on the LN substrate of the LN modulator 120, a optical coupler 801 may be provided in place of the branching unit 125, as depicted in FIG. 8.

The combining unit 124 outputs the positive-phase signal to the optical coupler 801. The optical coupler 801 is provided outside the LN modulator 120. The optical coupler 801 branches the positive-phase signal output from the combining unit 124. The optical coupler 801 outputs one positive-phase signal out of the branched positive-phase signals to the outside of the optical transmitting apparatus 100 and outputs the other positive-phase signal to the light receiving unit 141A.

Figure 9:
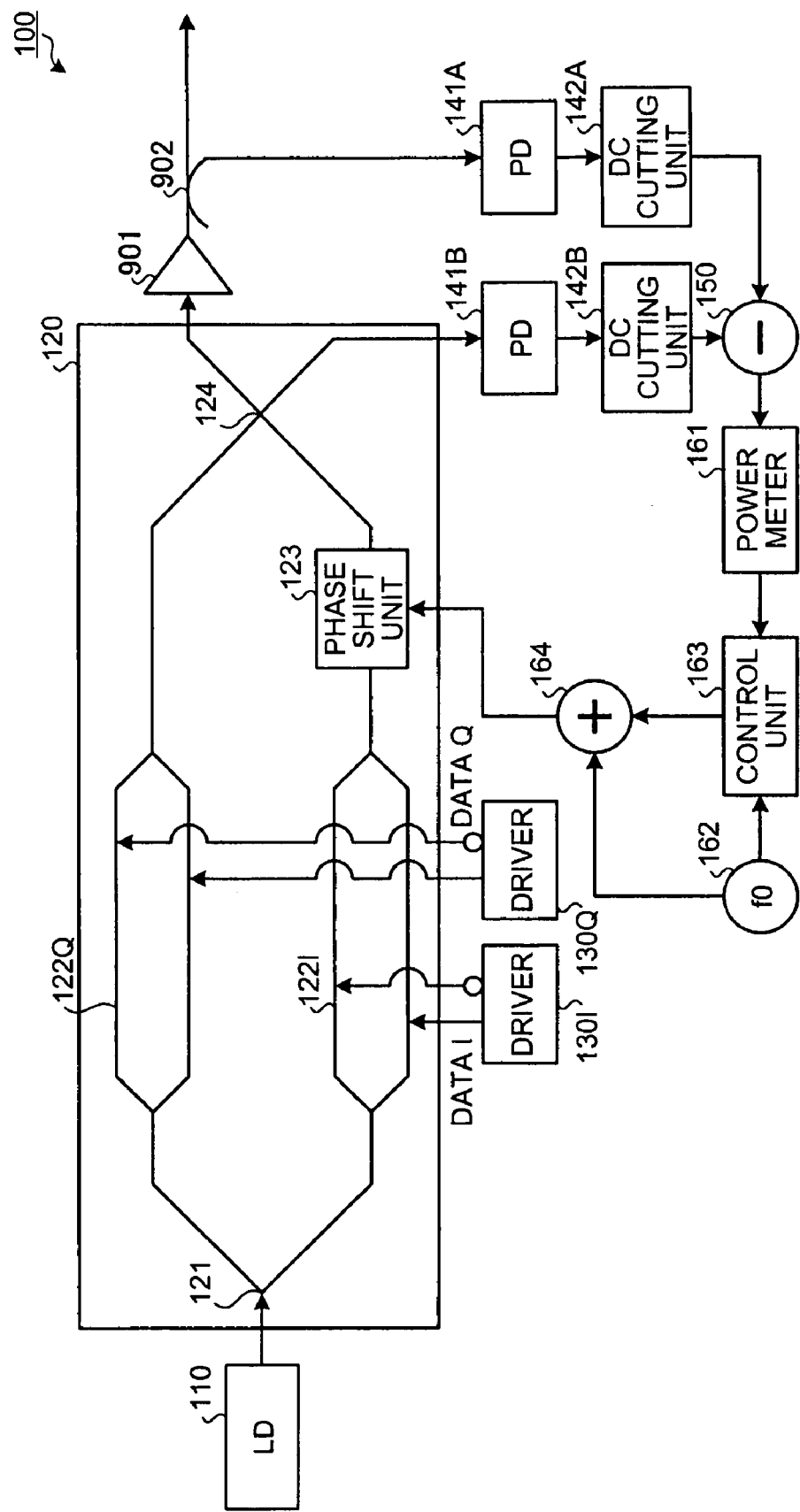
FIG. 9 is a block diagram of another example of the optical transmitting apparatus depicted in FIG. 1.

FIG. 9 is a block diagram of another example of the optical transmitting apparatus depicted in FIG. 1. In FIG. 9, with respect to the same configuration as depicted in FIG. 8, description thereof will be omitted, with the same reference numeral given thereto. As depicted in FIG. 9, an optical amplifier 901 and a branching unit 902 may be provided in place of the optical coupler 801 depicted in FIG. 8. The combining unit 124 outputs the positive-phase signal to the optical amplifier 901.

The optical amplifier 901 is provided outside the LN modulator 120. The optical amplifier 901 amplifies the positive-phase signal output from the combining unit 124 and outputs the amplified signal to the branching unit 902. The branching unit 902 branches the positive-phase signal output from the optical amplifier 901. The branching unit 902 outputs the branched positive-phase signals to the outside of the optical transmitting apparatus 100 and the light receiving apparatus 141A.

The optical amplifier 901 may be, for example, an optical amplifier that performs auto power control (APC). In this case, a monitoring signal may be branched from within the optical amplifier and output to the light receiving unit 141A. A subsequent stage module provided at a stage subsequent to the LN modulator 120 is not limited to the optical amplifier 901.

Figure 10:
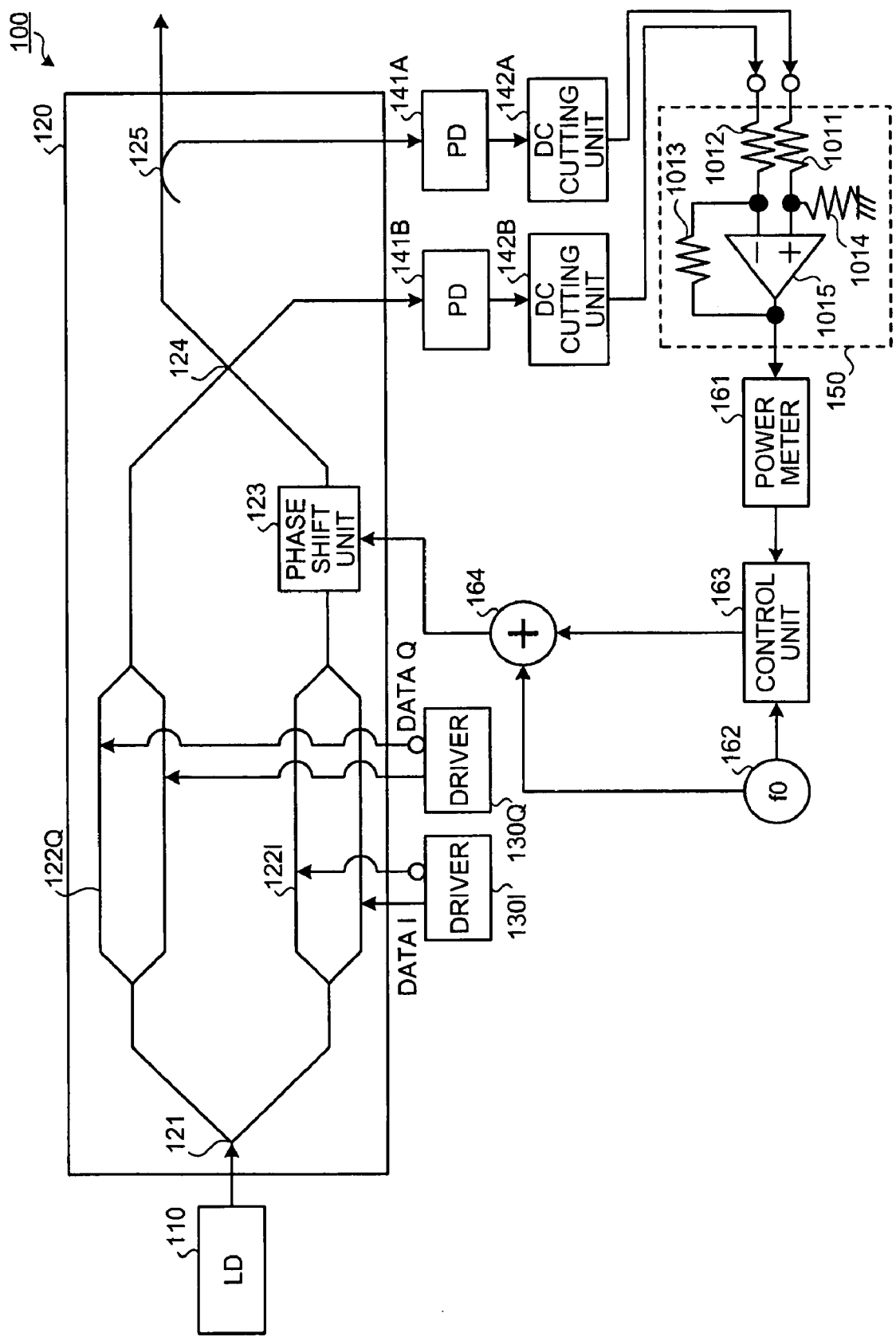
FIG. 10 is a block diagram of an example of the subtracting circuit depicted in FIG. 1.

FIG. 10 is a block diagram of an example of the subtracting circuit depicted in FIG. 1. In FIG. 10, with respect to the same configuration as depicted in FIG. 1, description thereof will be omitted, with the same reference numeral given thereto. As depicted in FIG. 10, the subtracting circuit 150 provided in the optical transmitting apparatus 100 is, for example, a differential amplifier using an operational amplifier. Here, by way of example, the subtracting circuit 150 includes a resistor 1011, a resistor 1012, a resistor 1013, a resistor 1014, and an operational amplifier 1015.

The resistor 1011 is connected to the DC cutting unit 142A and a plus input terminal of the operational amplifier 1015. The positive-phase signal output from the DC cutting unit 142A is input to the resistor 1011. The resistor 1012 is connected to the DC cutting unit 142B and a minus input terminal of the operational amplifier 1015. The positive-phase signal output from the DC cutting unit 142B is input to the resistor 1012.

The resistor 1013 is connected to a line between the resistor 1012 and the minus input terminal of the operational amplifier 1015 and to an output terminal of the operational amplifier 1015. One end of the resistor 1014 is connected to a line between the resistor 1011 and the plus input terminal of the operational amplifier 1015 and the other end is grounded. The output terminal of the operational amplifier 1015 is connected to the power meter 161. The differential signal is output from the output terminal of the operational amplifier 1015 to the power meter 161.

As above, the optical transmitting apparatus according to the first embodiment detects the differential signal obtained by a subtracting operation between the negative-phase signal and the positive-phase signal, and is capable of sharpening the change of the monitoring signal for the deviation of the phase difference between the arms. This enables, by monitoring the low-frequency signal component corresponding to the power change of the differential signal, improving the sensitivity of the control monitoring signal monitored by the control unit 163 and detecting the optimum point of the phase difference with high accuracy. For this reason, stabilization of the control is improved.

When the phase difference between the arms deviates from the optimum point, power of the differential signal changes over the wide band including a lower band. Therefore, circuits up to the control unit 163 are not required to employ circuits of an especially wide band but may employ general-use circuits. This enables achieving a lower cost and space saving.

Figure 11:
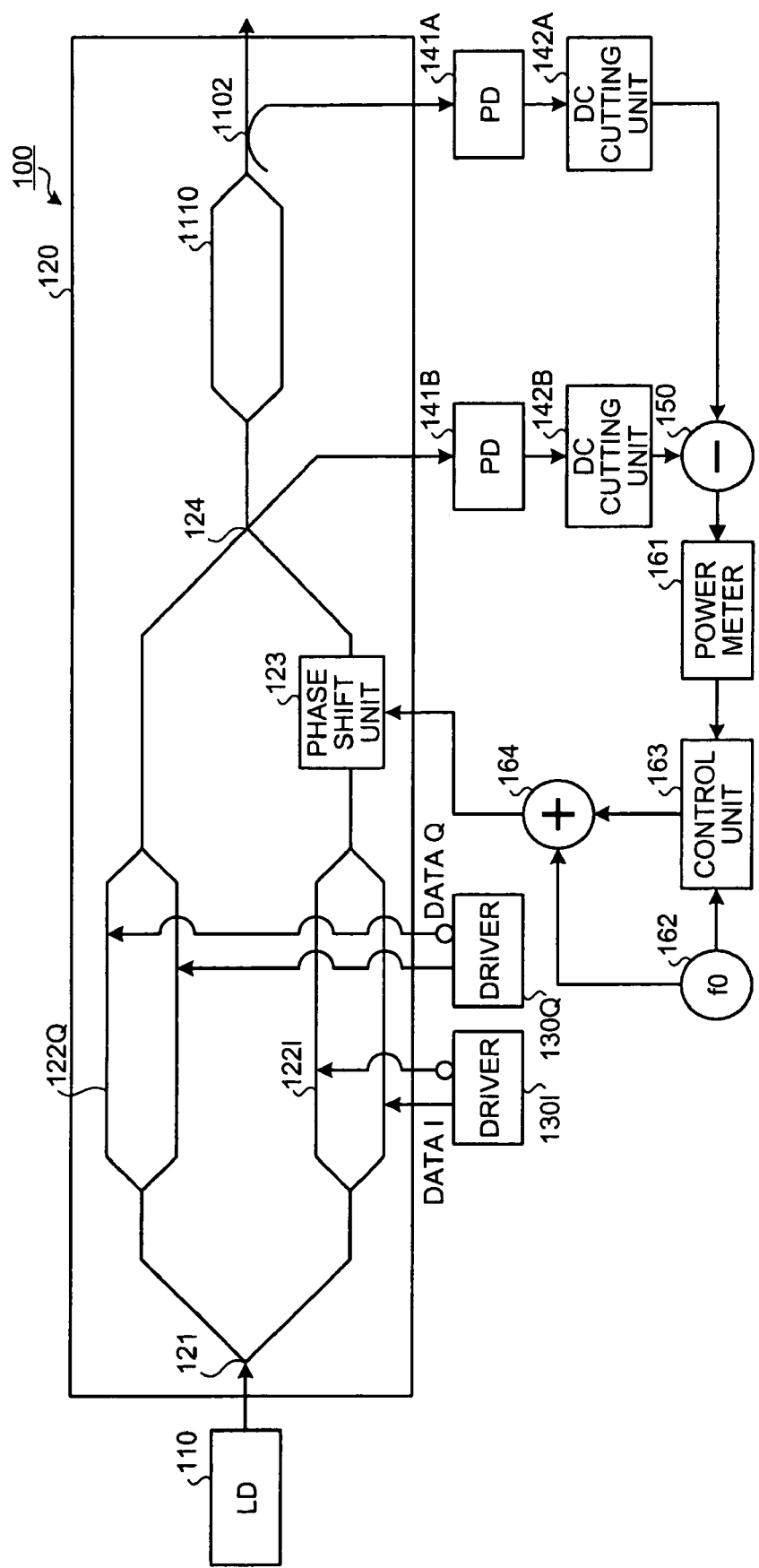
FIG. 11 is a block diagram of a functional configuration of an optical transmitting apparatus according to a second embodiment.

FIG. 11 is a block diagram of a functional configuration of an optical transmitting apparatus according to a second embodiment. In FIG. 11, with respect to the same configuration as depicted in FIG. 1, description thereof will be omitted, with the same reference numeral given thereto. As depicted in FIG. 11, the optical transmitting apparatus 100 according to the second embodiment is provided with a branching unit 1102 and an RZ modulator 1110 in place of the branching unit 125 depicted in FIG. 1.

The branching unit 1102 and the RZ modulator 1110 (second modulator) are provided on the LN substrate of the LN modulator 120. The RZ modulator 1110 RZ-pulses the positive-phase signal (DQPSK) output from the combining unit 124, based on a supplied clock signal (not shown).

The RZ modulator 1110 is a Mach-Zehnder modulator provided on the LN substrate of the LN modulator 120. The branching unit 1102 branches the positive-phase signal (RZ-DQPSK) RZ-pulsed by the RZ modulator 1110 and outputs the branched positive-phase signals to the outside and the light receiving unit 141A.

Figure 12:
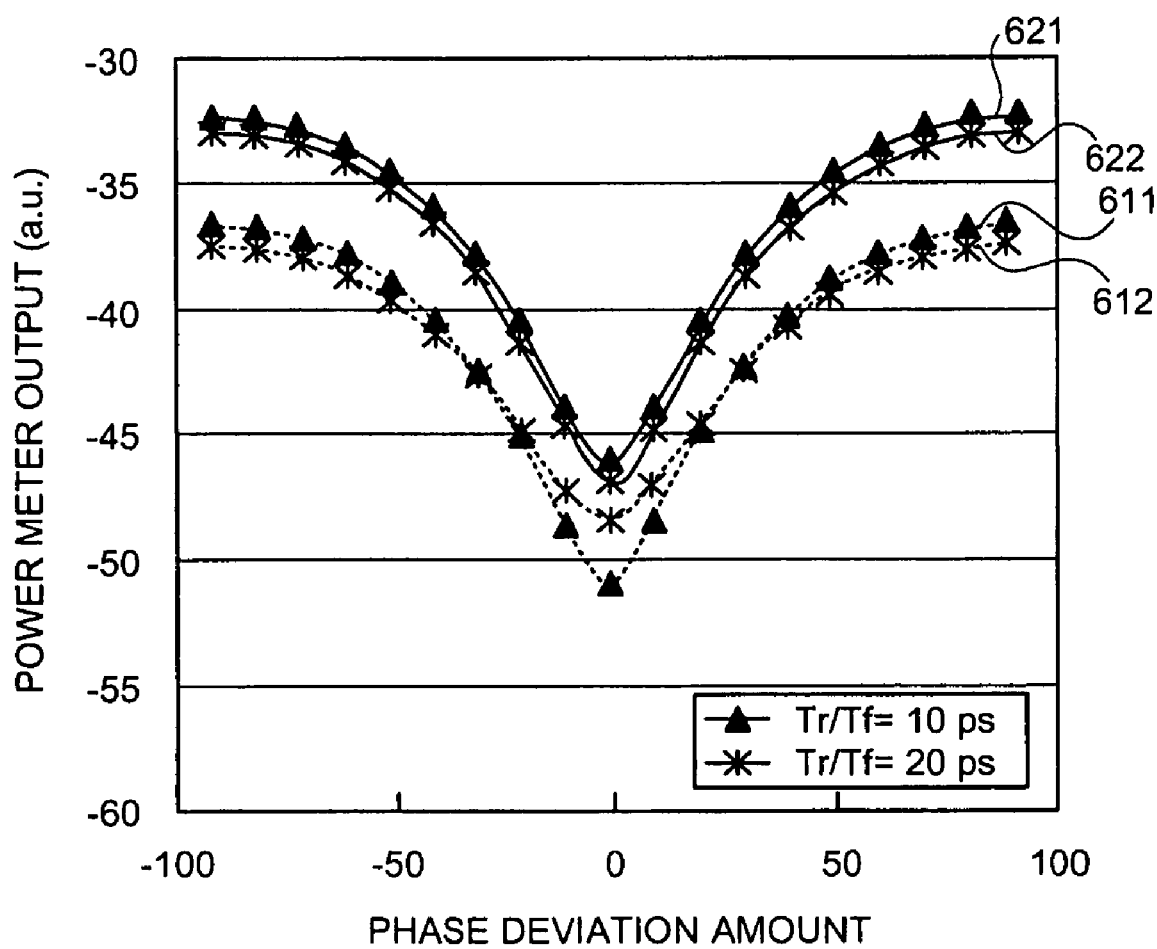
FIG. 12 is a graph of the output of the power meter depicted in FIG. 11.

FIG. 12 is a graph of the output of the power meter depicted in FIG. 11. In FIG. 12, with respect to the same part as depicted in FIG. 6, description thereof will be omitted, with the same reference numeral given thereto. As depicted by the dotted lines 611 and 612 and the solid lines 621 and 622, in the optical transmitting apparatus 100 according to the second embodiment, the amount of output change of the power meter 161 against the amount of phase deviation from the optimum point $n\pi/2$ (n is an arbitrary odd number) of the phase difference between the arms is substantially the same irrespective of values of the characteristic Tr/Tf.

Conventionally, when the characteristic Tr/Tf was 10 ps, the change of the output of the power meter 161 against the change of the phase deviation amount was gently-sloping (see dotted line 611). By contrast, according to the optical transmitting apparatus 100, even when the characteristic Tr/Tf is 10 ps, the change of the output of the power meter 161 against the change of the phase deviation amount becomes steeper (see solid line 621), in a similar manner as when the characteristic Tr/Tf is 20 ps.

As seen above, the optical transmitting apparatus 100 according to the second embodiment has the effect of the optical transmitting apparatus 100 according to the first embodiment and, by using the positive-phase signal output from the RZ modulator 1110, is capable of detecting the deviation of the phase difference between the arms at high sensitivity at the control unit 163, irrespective of the characteristic Tr/Tf. Therefore, the control signal is adjusted to the optimum point with high accuracy and the control stability is further improved.

Because of the capability of detecting the deviation of the phase difference between the arms at high sensitivity without depending on the characteristic Tr/Tf, even if a low-cost driver is used instead of the driver 130I and the driver 130Q, the deviation of the phase difference between the arms can be detected at high sensitivity, and a lower cost of the apparatus can be achieved.

Figure 13:
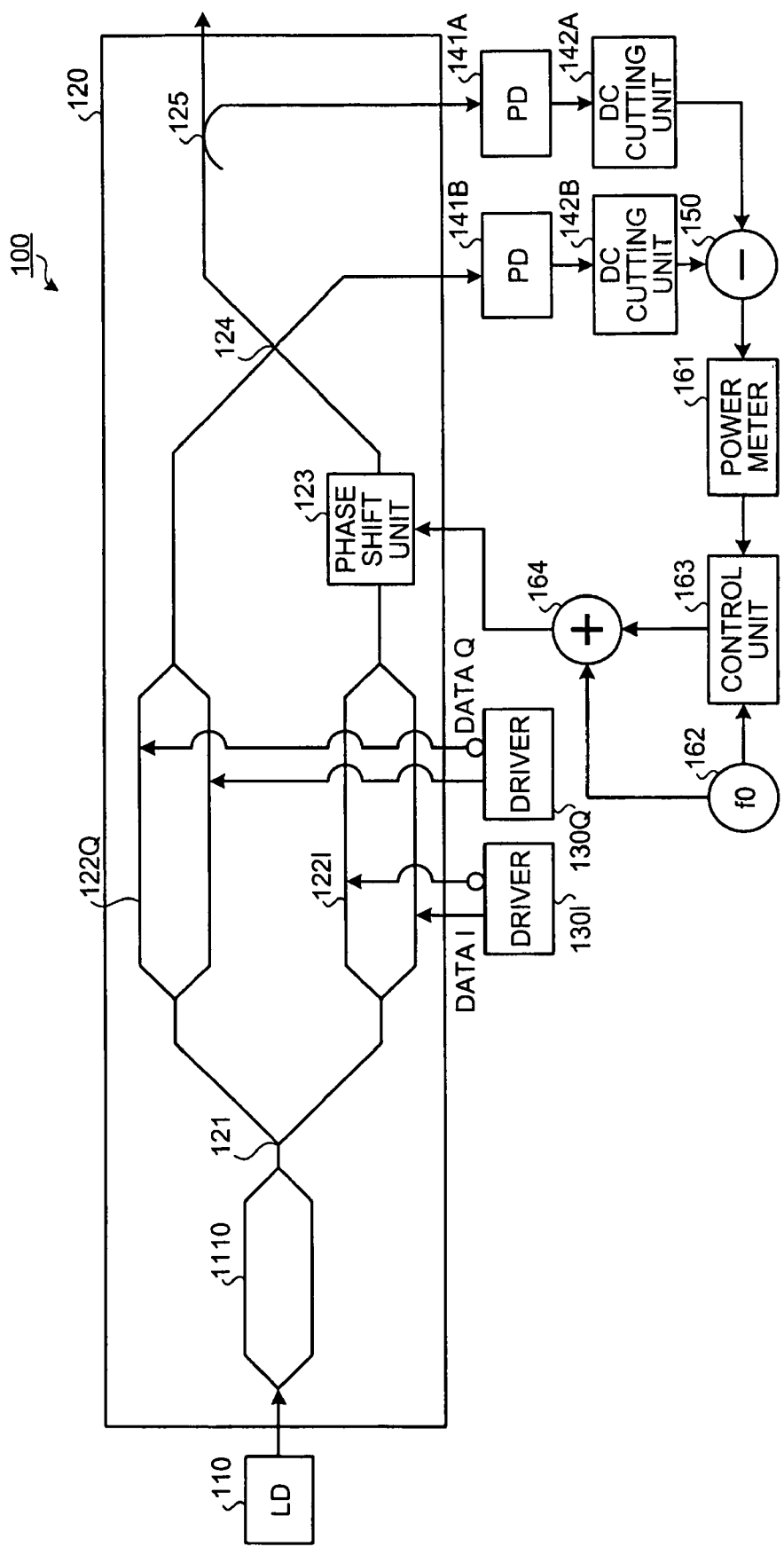
FIG. 13 is a block diagram of a functional configuration of an optical transmitting apparatus according to a third embodiment.

FIG. 13 is a block diagram of a functional configuration of an optical transmitting apparatus according to a third embodiment. In FIG. 13, with respect to the same configuration as depicted in FIG. 1 or FIG. 11, description thereof will be omitted, with the same reference numeral given thereto. As depicted in FIG. 13, the optical transmitting apparatus 100 according to the third embodiment is provided with the RZ modulator 1110 depicted in FIG. 11 at the stage prior to the branching unit 121 depicted in FIG. 1. The light source 110 outputs generated continuous light to the RZ modulator 1110. The RZ modulator 1110 RZ-pulses the continuous light output from the light source 110 and outputs the RZ-pulsed continuous light to the branching unit 121.

Figure 14:
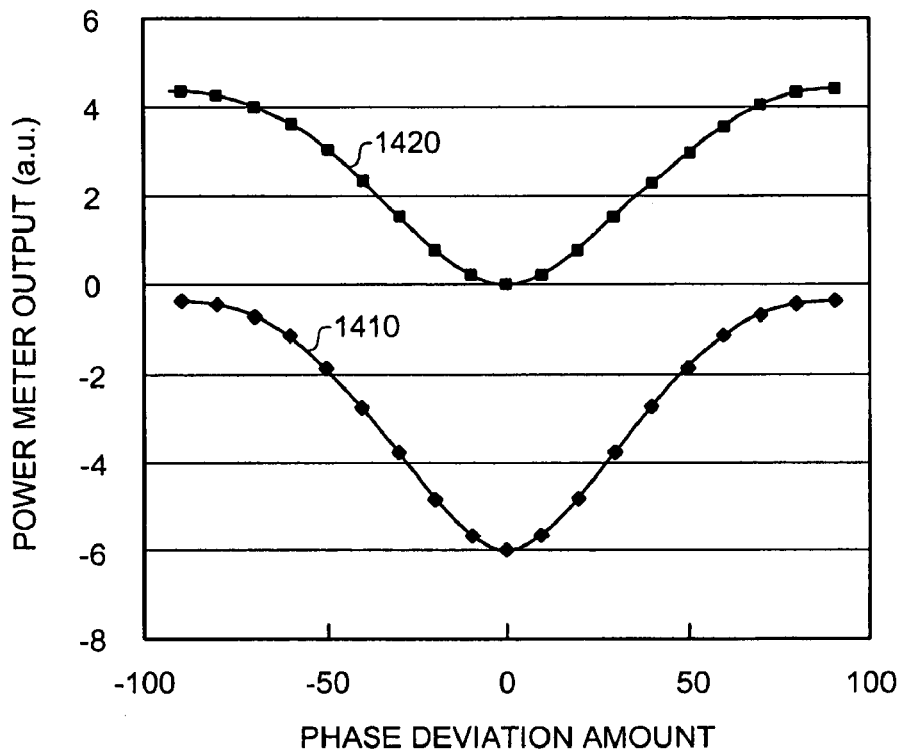
FIG. 14 is a graph of the output (without DC component) of the power meter depicted in FIG. 13.

FIG. 14 is a graph of the output (without DC component) of the power meter depicted in FIG. 13. In FIG. 14, with respect to the same part as depicted in FIG. 6, description thereof will be omitted. FIG. 14 depicts the output of the power meter 161 when the optical transmitting apparatus 100 is provided with the DC cutting part 142A and the DC cutting part 142B as depicted in FIG. 13.

In this case, since a DC component is removed by the DC cutting part 142A and the DC cutting part 142B, the positive-phase signal and the negative-phase signal output to the subtracting circuit 150 are of an AC component. A solid line 1410 indicates a relationship between the phase deviation amount and the output of the power meter 161 in the conventional optical transmitting apparatus. A solid line 1420 indicates a relationship between the phase deviation amount along the horizontal axis and the output of the power meter 161 along the vertical axis in the optical transmitting apparatus 100.

As depicted by the solid line 1410 and the solid line 1420, the optical transmitting apparatus 100 according to the third embodiment is capable of increasing an absolute value of the output of the power meter 161 twice as much as that of the conventional optical transmitting apparatus. Therefore, the optical transmitting apparatus 100 is capable of detecting the deviation of the phase difference between the arms of the LN modulator 120 at high sensitivity at the control unit 163.

Figure 15:
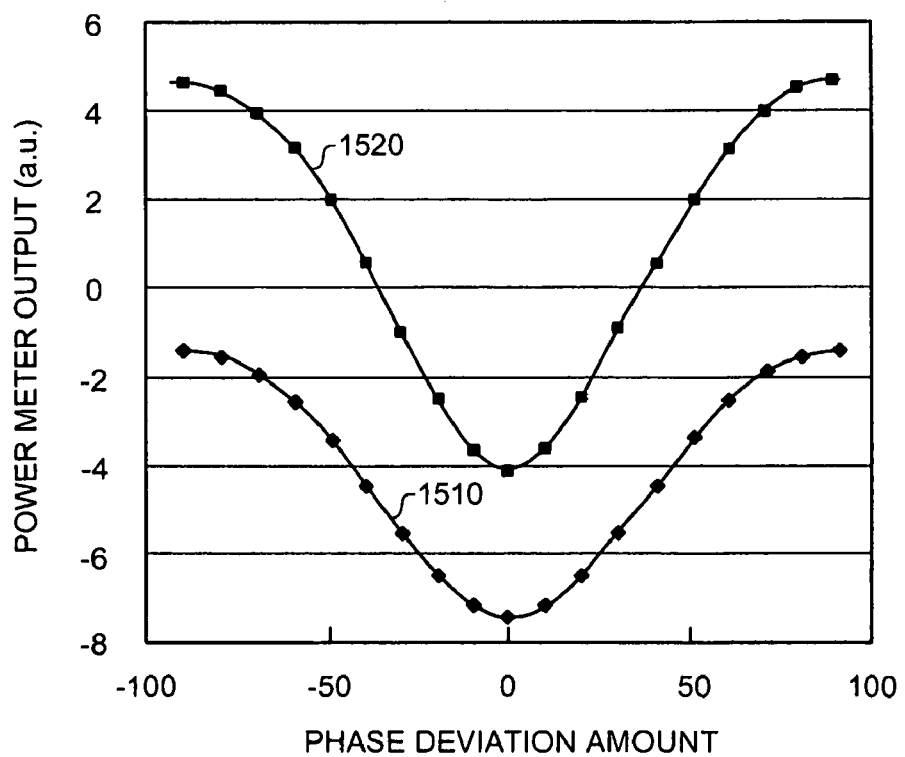
FIG. 15 is a graph of the output (with DC component) of the power meter depicted in FIG. 13.

FIG. 15 is a graph of the output (with DC component) of the power meter depicted in FIG. 13. In FIG. 15, with respect to the same part as depicted in FIG. 14, description thereof will be omitted, with same reference numeral given thereto. FIG. 15 depicts the output of the power meter 161 when the optical transmitting apparatus 100 is not provided with the DC cutting part 142A or the DC cutting part 142B.

In this case, since a DC component is not removed by the DC cutting part 142A or the DC cutting part 142B, the positive-phase signal and the negative-phase signal output to the subtracting circuit 150 are signals containing both the AC component and the DC component. A solid line 1510 indicates a relationship between the phase deviation amount along the horizontal axis and the output of the power meter 161 along the vertical axis in the conventional optical transmitting apparatus.

A solid line 1520 indicates a relationship between the phase deviation amount and the output of the power meter 161 in the optical transmitting apparatus 100. As depicted by the solid line 1510 and the solid line 1520, the optical transmitting apparatus 100, when not provided with the DC cutting part 142A or the DC cutting part 142B, is capable of increasing the absolute value of the output of the power meter 161, as compared with the conventional optical transmitting apparatus.

The change of the output of the power meter 161 against the phase deviation amount can be made sharper (1.5 times or more) in the vicinity of the optimum point (0) of the phase deviation amount. Therefore, the optical transmitting apparatus 100 is capable of detecting the deviation of the phase difference between the arms at high sensitivity at the control unit 163.

As seen above, the optical transmitting apparatus 100 according to the third embodiment has the effect of the optical transmitting apparatus 100 according to the first embodiment and, by proving the RZ modulator 1110 at the stage before the branching unit 121 and performing the RZ modulation, is capable of increasing the absolute value of the output of the power meter 161. Therefore, the deviation of the phase difference between the arms can be detected at high sensitivity.

In the configuration of the optical transmitting apparatus 100 depicted in FIG. 13, the positive-phase signal output from the RZ modulator 1110 may be output to the DC cutting unit 142A and the negative-phase signal output from the RZ modulator 1110 may be output to the branching unit 121. However, in this case, since the phase difference between the arms is not reflected on the positive-phase signal, the above effects are obtained.

Figure 16:
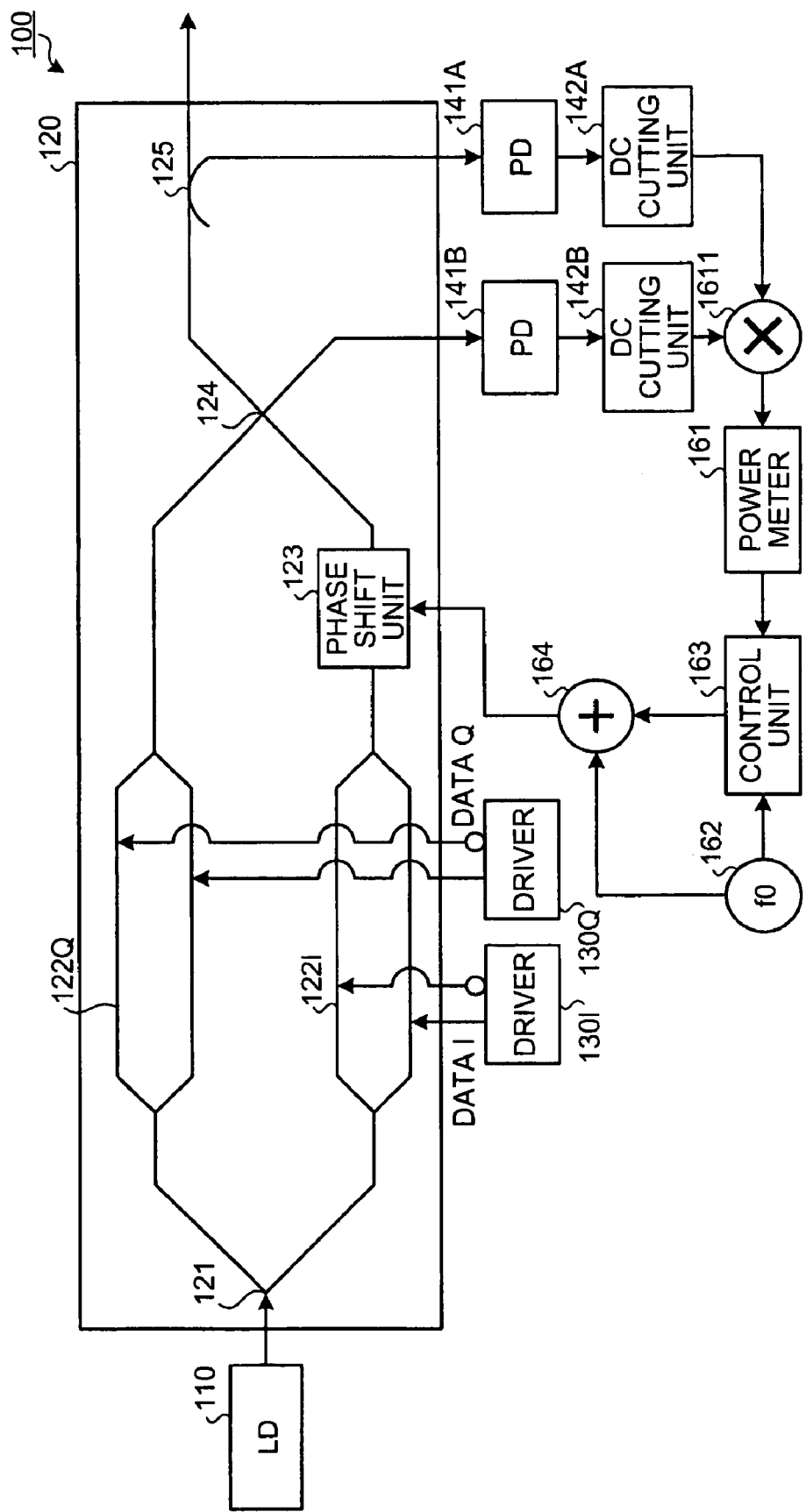
FIG. 16 is a block diagram of a functional configuration of an optical transmitting apparatus according to a fourth embodiment.

FIG. 16 is a block diagram of a functional configuration of an optical transmitting apparatus according to a fourth embodiment. In FIG. 16, with respect to the same configuration as depicted in FIG. 1, description thereof will be omitted, with the same reference numeral given thereto. The optical transmitting apparatus 100 according to the fourth embodiment includes a multiplying circuit 1611 provided in place of the subtracting circuit 150 depicted in FIG. 1.

The DC cutting unit 142A outputs the positive-phase signal with the DC component removed therefrom to the multiplying circuit 1611. The DC cutting unit 142B outputs the negative-phase signal with the DC component removed therefrom to the multiplying circuit 1611. The multiplying circuit 1611 multiplies the positive-phase signal output from the DC cutting unit 142A and the negative-phase signal output from the DC cutting unit 142B together.

The multiplying circuit 1611 outputs a multiplied signal obtained by multiplication to the power meter 161. The control unit 163 performs the synchronous detection based on the signal output from the power meter 161 and the low-frequency signal output from the oscillator circuit 162. The control unit 163 outputs the control signal to the adding circuit 164, based on the change of the low-frequency signal component contained in the power meter output signal as detected by the synchronous detection.

Figure 17:
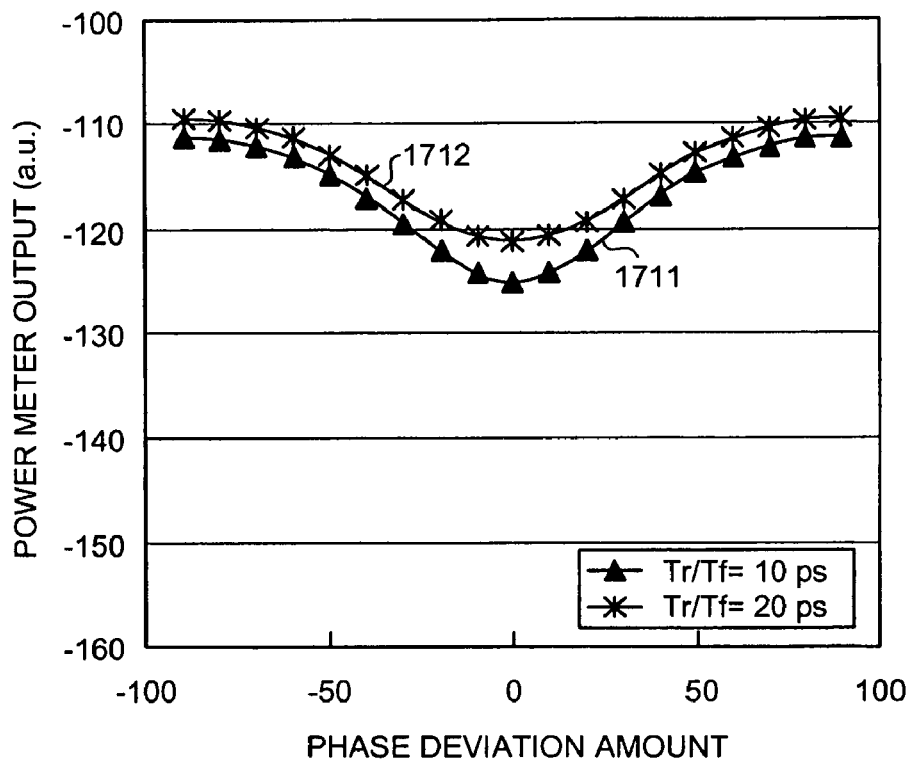
FIG. 17 is a graph of the output (without DC component) of the power meter depicted in FIG. 16.

FIG. 17 is a graph of the output (without DC component) of the power meter depicted in FIG. 16. In FIG. 17, with respect to the same part as depicted in FIG. 6, description thereof will be omitted. FIG. 17 depicts the output of the power meter 161 when the optical transmitting apparatus 100 is provided with the DC cutting part 142A and the DC cutting part 142B as depicted in FIG. 16. In this case, the positive-phase signal and the negative-phase signal output to the multiplying circuit 1611 are of the AC component only.

A solid line 1711 (with triangle marks) indicates a relationship between the phase deviation amount and the output of the power meter 161 when the rising and falling characteristic Tr/Tf of the Data I and the Data Q is 10 ps. A solid line 1712 (with asterisk marks) indicates a relationship between the phase deviation amount and the output of the power meter 161 when the characteristic Tr/Tf is 20 ps.

Figure 18:
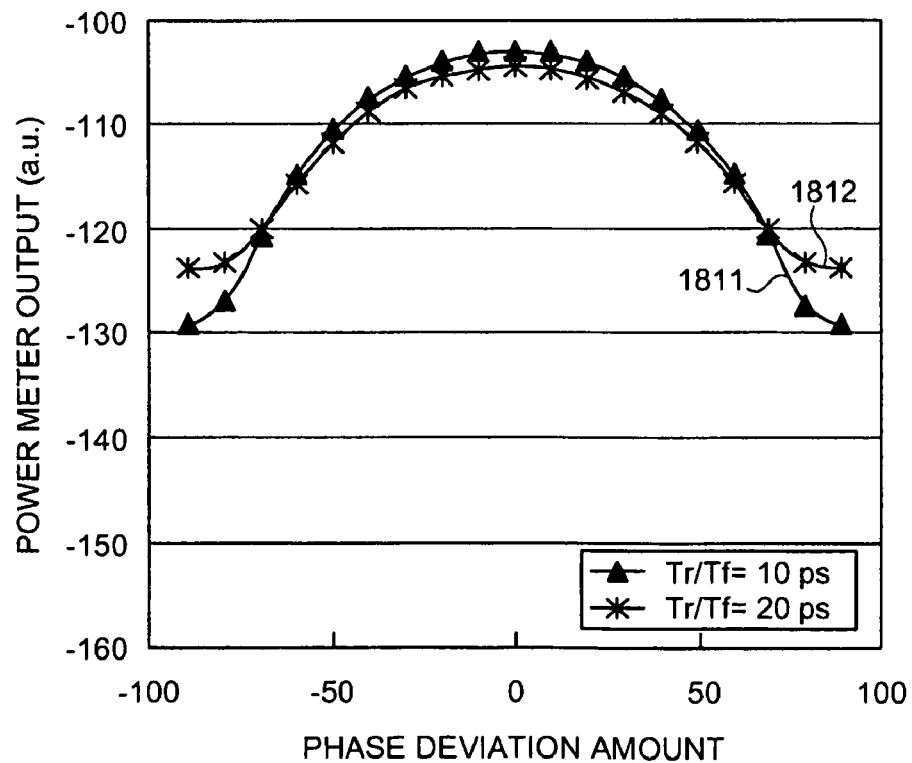
FIG. 18 is a graph of the output (with DC component) of the power meter depicted in FIG. 16.

FIG. 18 is a graph of the output (with DC component) of the power meter depicted in FIG. 16. In FIG. 18, with respect to the same part as depicted in FIG. 6, description thereof will be omitted. FIG. 18 depicts the output of the power meter 161 when the optical transmitting apparatus 100 is not provided with the DC cutting part 142A or the DC cutting part 142B. In this case, the positive-phase signal and the negative-phase signal output to the multiplying circuit 1611 are signals containing the AC component and the DC component.

A solid line 1811 (with triangle marks) indicates a relationship between the phase deviation amount and the output of the power meter 161 when the rising and falling characteristic Tr/Tf of the Data I and the Data Q is 10 ps. A solid line 1812 (with asterisk marks) indicates a relationship between the phase deviation amount and the output of the power meter 161 when the characteristic Tr/Tf is 20 ps.

As depicted by the solid line 1811 and the solid line 1812, when the optical transmitting apparatus 100 is not provided with the DC cutting unit 142A or the DC cutting unit 142B, the output of the power meter 161 comes to a maximum at the time of the phase deviation amount being at the optimum point (0). The control unit 163 changes the control signal output to the adding circuit 164 so that the frequency f0 component of the signal output from the power meter 161 comes to a minimum.

As seen above, the optical transmitting apparatus 100 according to the fourth embodiment detects the power of the multiplied signal obtained by multiplying the positive-phase signal with the negative-phase signal and does not include the DC cutting unit 142A or the DC cutting unit 142B, whereby the output of the power meter 161 reaches the maximum when the phase deviation amount is at the optimum point (0) (see FIG. 18). Since the frequency f0 component detected at the control unit 163 is almost zero at the optimum point of the phase difference in a similar manner as in other embodiments described above, control algorithm inside the control unit 163 is identical to the control algorithm of other embodiments described above.

This enables increasing the absolute value of the output of the power meter 161 in the neighborhood of the optimum point of the phase deviation amount and improving the control stability. The multiplied signal obtained by multiplying the positive-phase signal and the negative-phase signal together changes power over the wide band including a lower band when the phase difference between the arms deviates from the optimum point. Therefore, the circuit realizing the control unit 163 is not required to employ a circuit of an especially wide band but may employ a general-use circuit. This enables achieving a lower cost and space saving.

Figure 19:
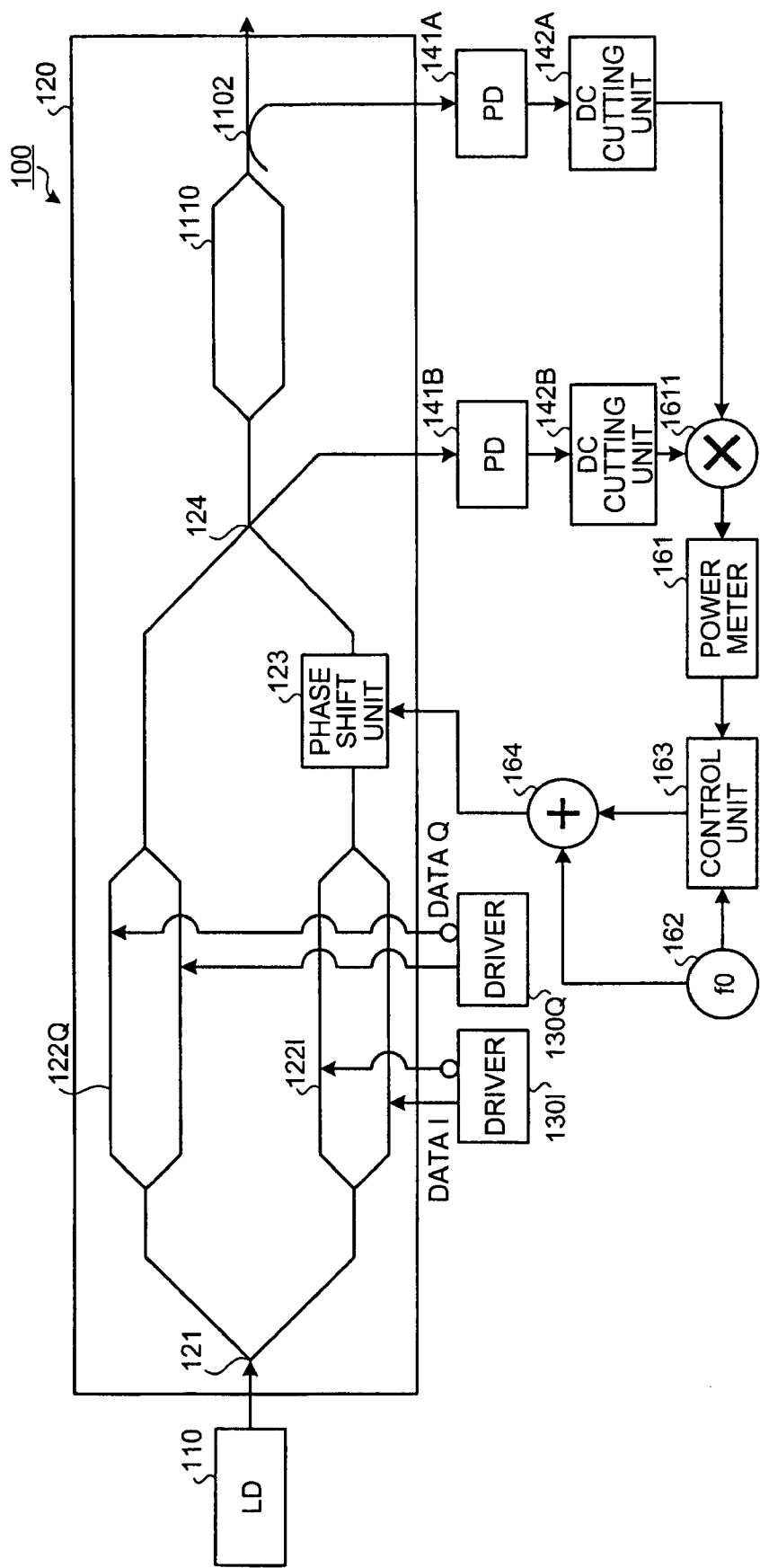
FIG. 19 is a block diagram of a functional configuration of an optical transmitting apparatus according to a fifth embodiment.

FIG. 19 is a block diagram of a functional configuration of an optical transmitting apparatus according to a fifth embodiment. In FIG. 19, with respect to the same configuration as depicted in FIG. 11 or FIG. 16, description thereof will be omitted, with the same reference numeral given thereto. As depicted in FIG. 19, the optical transmitting apparatus 100 according to the fifth embodiment includes the multiplying circuit 1611 depicted in FIG. 16 instead of the subtracting circuit 150 depicted in FIG. 11.

Figure 20:
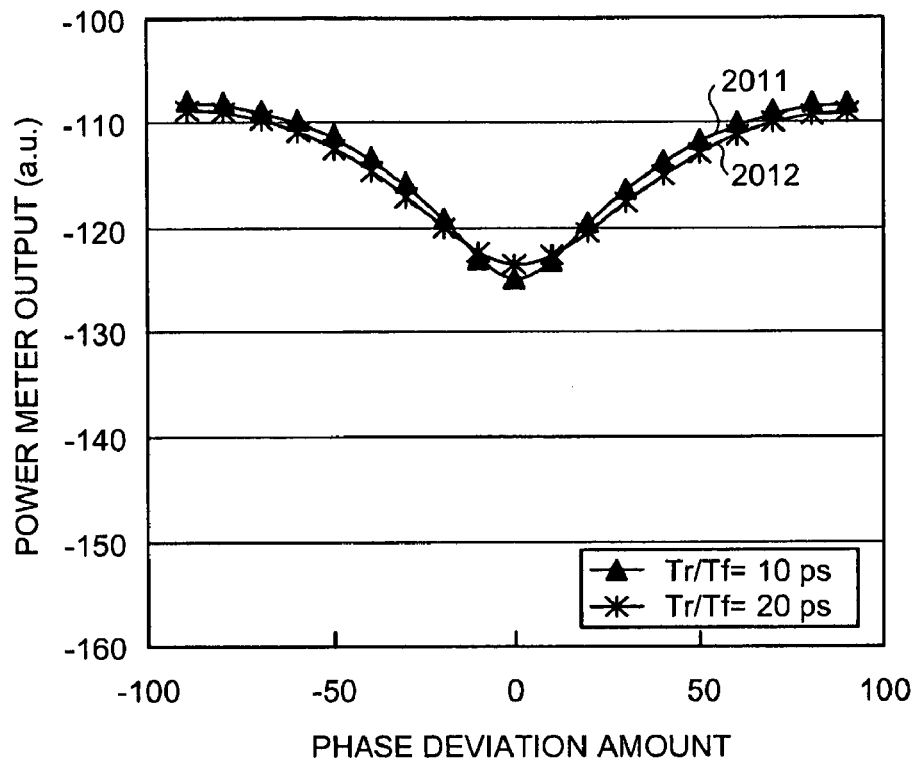
FIG. 20 is a graph of the output (without DC component) of the power meter depicted in FIG. 19.

FIG. 20 is a graph of the output (without DC component) of the power meter depicted in FIG. 19. In FIG. 20, with respect to the same part as depicted in FIG. 6, description thereof will be omitted. FIG. 20 depicts the output of the power meter 161 when the optical transmitting apparatus 100 is provided with the DC cutting part 142A and the DC cutting part 142B as depicted in FIG. 19. The positive-phase signal and the negative-phase signal output to the multiplying circuit 1611 are of the AC component only.

A solid line 2011 (with triangle marks) indicates a relationship between the phase deviation amount and the output of the power meter 161 when the rising and falling characteristic Tr/Tf of the Data I and the Data Q is 10 ps. A solid line 2012 (with asterisk marks) indicates a relationship between the phase deviation amount and the output of the power meter 161 when the characteristic Tr/Tf is 20 ps.

Figure 21:
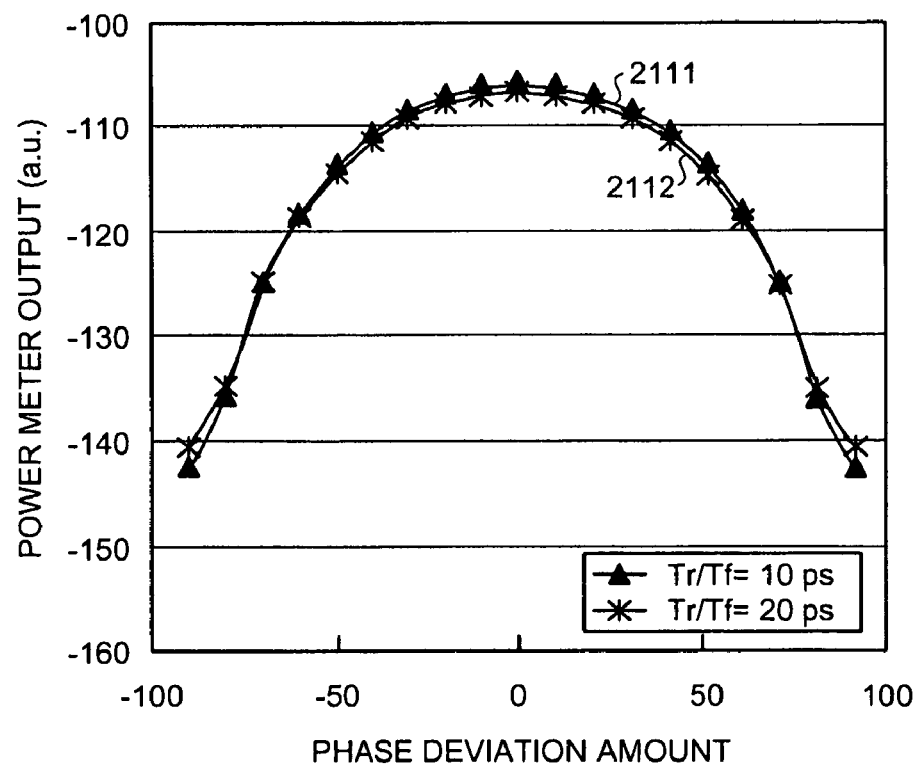
FIG. 21 is a graph of the output (with DC component) of the power meter depicted in FIG. 19.

FIG. 21 is a graph of the output (with DC component) of the power meter depicted in FIG. 19. In FIG. 21, with respect to the same part as depicted in FIG. 6, description thereof will be omitted. FIG. 21 depicts the output of the power meter 161 when the optical transmitting apparatus 100 is not provided with the DC cutting part 142A or the DC cutting part 142B. In this case, the positive-phase signal and the negative-phase signal output to the multiplying circuit 1611 are signals containing the AC component and the DC component.

A solid line 2111 (with triangle marks) indicates a relationship between the phase deviation amount and the output of the power meter 161 when the rising and falling characteristic Tr/Tf of the Data I and the Data Q is 10 ps. A solid line 2112 (with asterisk marks) indicates a relationship between the phase deviation amount and the output of the power meter 161 when the characteristic Tr/Tf is 20 ps.

As depicted by the solid line 2111 and the solid line 2112, when the optical transmitting apparatus 100 is not provided with the DC cutting unit 142A or the DC cutting unit 142B, the output of the power meter 161 comes to a maximum at the time of the phase deviation amount being at the optimum point (0). The control unit 163 changes the control signal output to the adding circuit 164 so that the frequency f0 component of the signal output from the power meter 161 comes to a minimum.

As seen above, when the optical transmitting apparatus 100 according to the fifth embodiment is configured not to include the DC cutting unit 142A or the DC cutting unit 142B, at the time of detecting the power of the multiplied signal obtained by multiplying the positive-phase signal and the negative-phase signal together, the output of the power meter 161 reaches the maximum when the phase deviation amount is at the optimum point (0) (see FIG. 21).

Since the frequency f0 component detected at the control unit 163 has minimum amplitude almost equal to zero at the optimum point of the phase difference in a similar manner as in other embodiments described above, the control algorithm inside the control unit 163 is identical to control algorithm of other embodiments described above. This enables increasing the absolute value of the output of the power meter 161 in the vicinity of the optimum point of the phase deviation amount, adjusting the control signal at the optimum point with high accuracy, and improving the control stability.

Power of the multiplied signal obtained by multiplying the positive-phase signal and the negative-phase signal together changes over a wide band including a lower band when the phase difference between the arms deviates from the optimum point. Therefore, the circuit realizing the control unit 163 is not required to employ a circuit for an especially wide band but may employ a general-use circuit. This enables achieving a lower cost and space saving.

Figure 22:
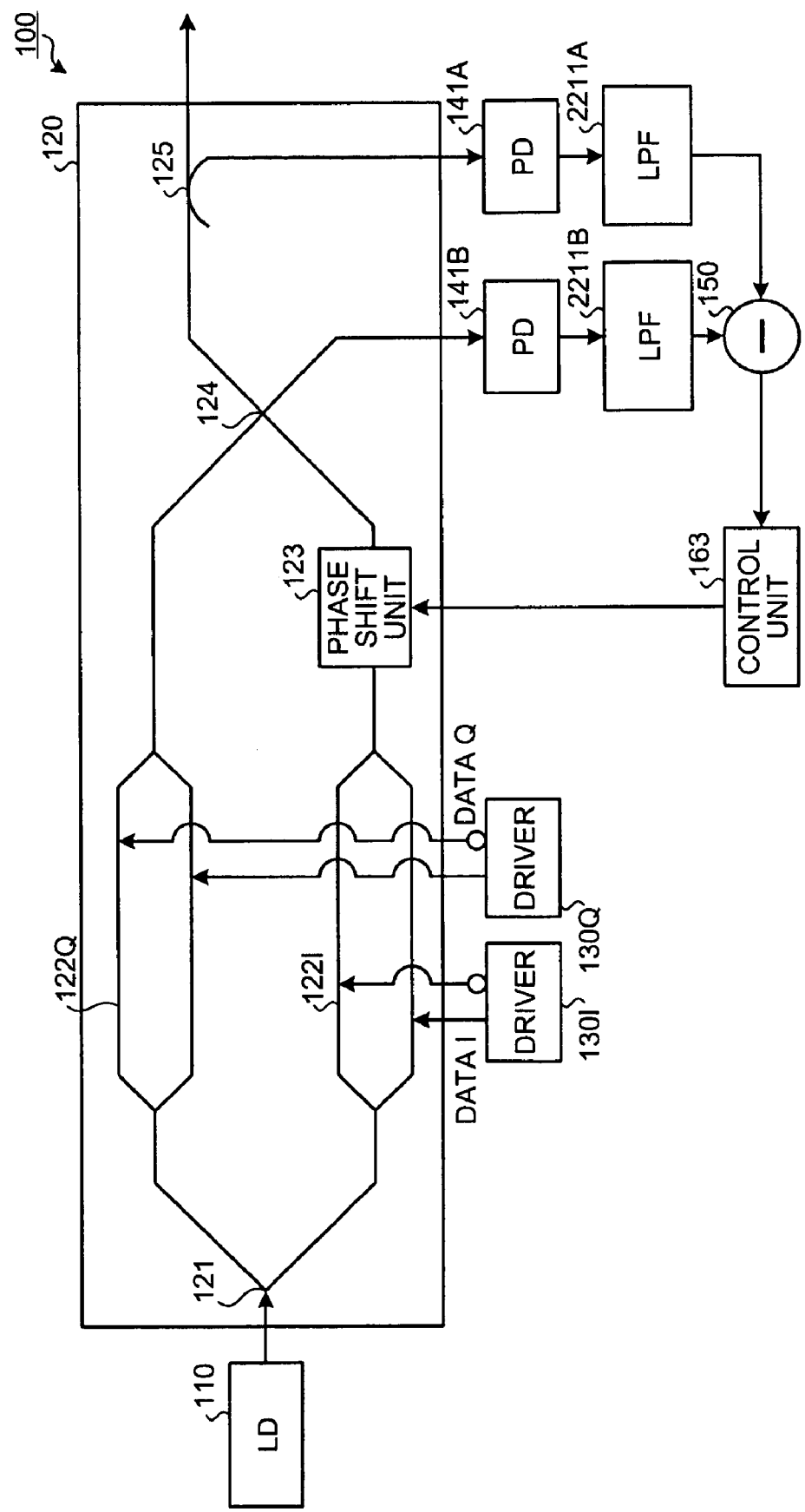
FIG. 22 is a block diagram of a functional configuration of an optical transmitting apparatus according to a sixth embodiment.

FIG. 22 is a block diagram of a functional configuration of an optical transmitting apparatus according to a sixth embodiment. In FIG. 22, with respect to the same configuration as depicted in FIG. 1, description thereof will be omitted, with the same reference numeral given thereto. As depicted in FIG. 22, the optical transmitting apparatus 100 according to the sixth embodiment includes a low pass filter (LPF) 2211A and a low pass filter 2211B instead of the DC cutting unit 142A, the DC cutting unit 142B, the oscillator circuit 162, the adding circuit 164 and the power meter 161 depicted in FIG. 1.

The phase shift unit 123 shifts the phase difference of the light between the phase modulating units 122I and 122Q according to the control signal output from the control unit 163. The light receiving unit 141A converts the received positive-phase signal to an electric signal and outputs the electric signal to the low pass filter 2211A. The light receiving unit 141B converts the received negative-phase signal to an electric signal and outputs the electric signal to the low pass filter 2211B.

The low pass filter 2211A extracts a band component below a predetermined frequency of the positive-phase signal output from the light receiving unit 141A and outputs the filtered signal to the subtracting unit 150. The low pass filter 2211B extracts a band component below a predetermined frequency of the negative-phase signal output from the light receiving unit 141B and outputs the filtered signal to the subtracting unit 150. The subtracting circuit 150 calculates a difference between the positive-phase signal output from the low pass filter 2211A and the negative-phase signal output from the low pass filter 2211B.

The control unit 163 outputs the control signal to the phase shift unit 123. The control unit 163 changes the control signal output to the phase shift unit 123, based on the signal output from the subtracting unit 150. As seen above, in the sixth embodiment, the control unit 163, without performing the synchronous detection, changes the control signal based on the signal output from the subtracting circuit 150.

Figure 23:
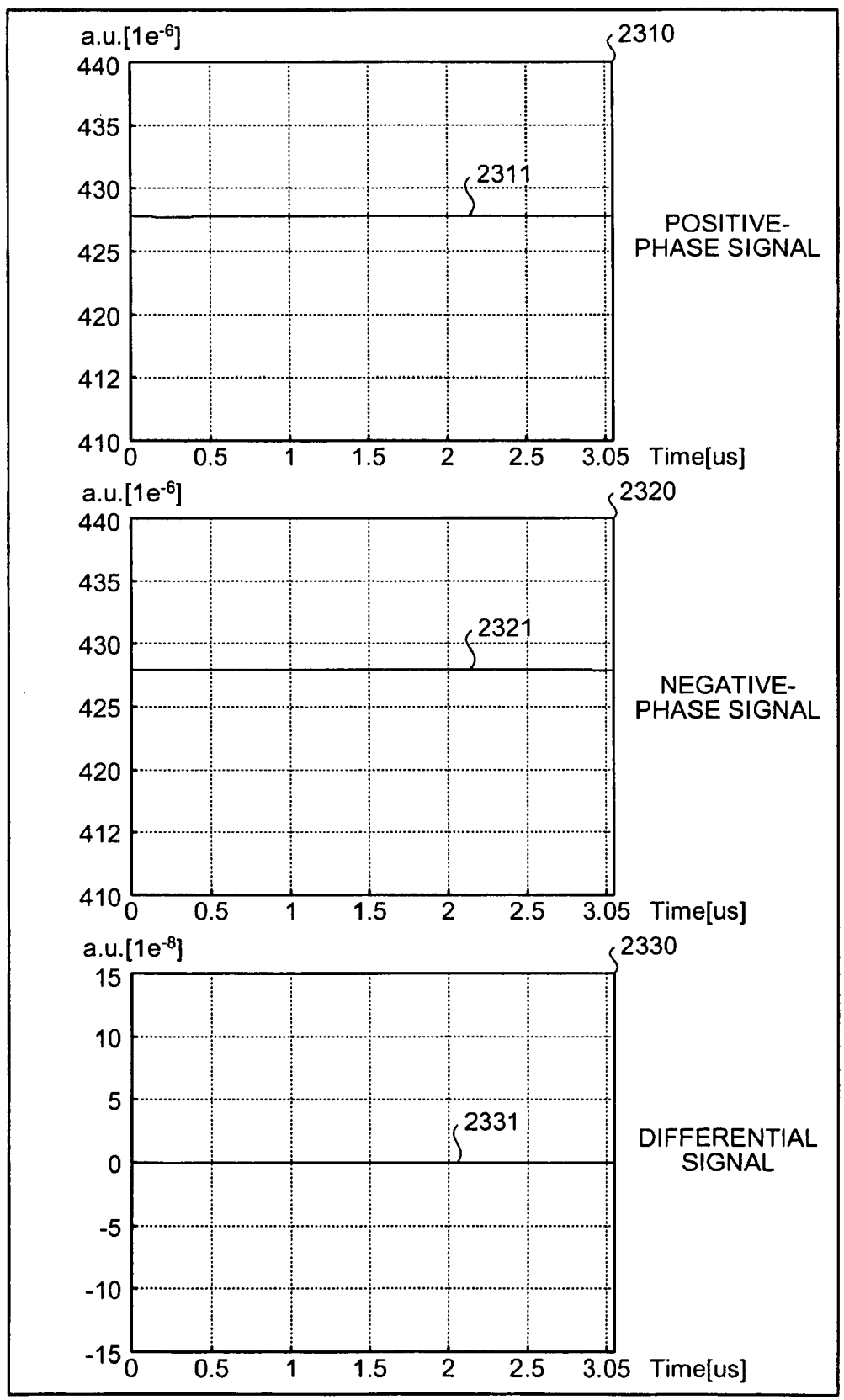
FIG. 23 is a waveform chart of signals when the phase difference is at the optimum point.

FIG. 23 is a waveform chart of signals when the phase difference is at the optimum point. In each of graphs 2310, 2320, and 2330 of FIG. 23, the horizontal axis represents time (Time [us]). In each of the graphs 2310 and 2320, the vertical axis represents power (a.u.) of the signal. In the graph 2330, the vertical axis represents power (a.u.) of the signal (the same is applicable to FIGS. 24 and 25).

The waveforms of the graphs 2310, 2320, and 2330 indicate respective signals when the phase difference between the arms of the LN modulator 120 is at the optimum point. A waveform 2311 of the graph 2310 indicates the waveform of the positive-phase signal output from the combining unit 124 to the light receiving unit 141A.

A waveform 2321 of the graph 2320 indicates the waveform of the negative-phase signal output from the combining unit 124 to the light receiving unit 141B. A waveform 2331 of the graph 2330 indicates the waveform of the differential signal output from the subtracting circuit 150 to the control unit 163. The waveform 2331 is a waveform obtained by subtracting the waveform 2321 from the waveform 2311. Here, the waveform 2311 and the waveform 2321 are constant at the power of about 428 a.u.

When the phase difference between the arms is at the optimum point, the positive-phase signal and the negative-phase signal are of almost identical waveform, as depicted by the waveform 2311 and the waveform 2321. Therefore, the differential signal depicted by the waveform 2331 of the graph 2330 is constant at substantially zero.

Figure 24:
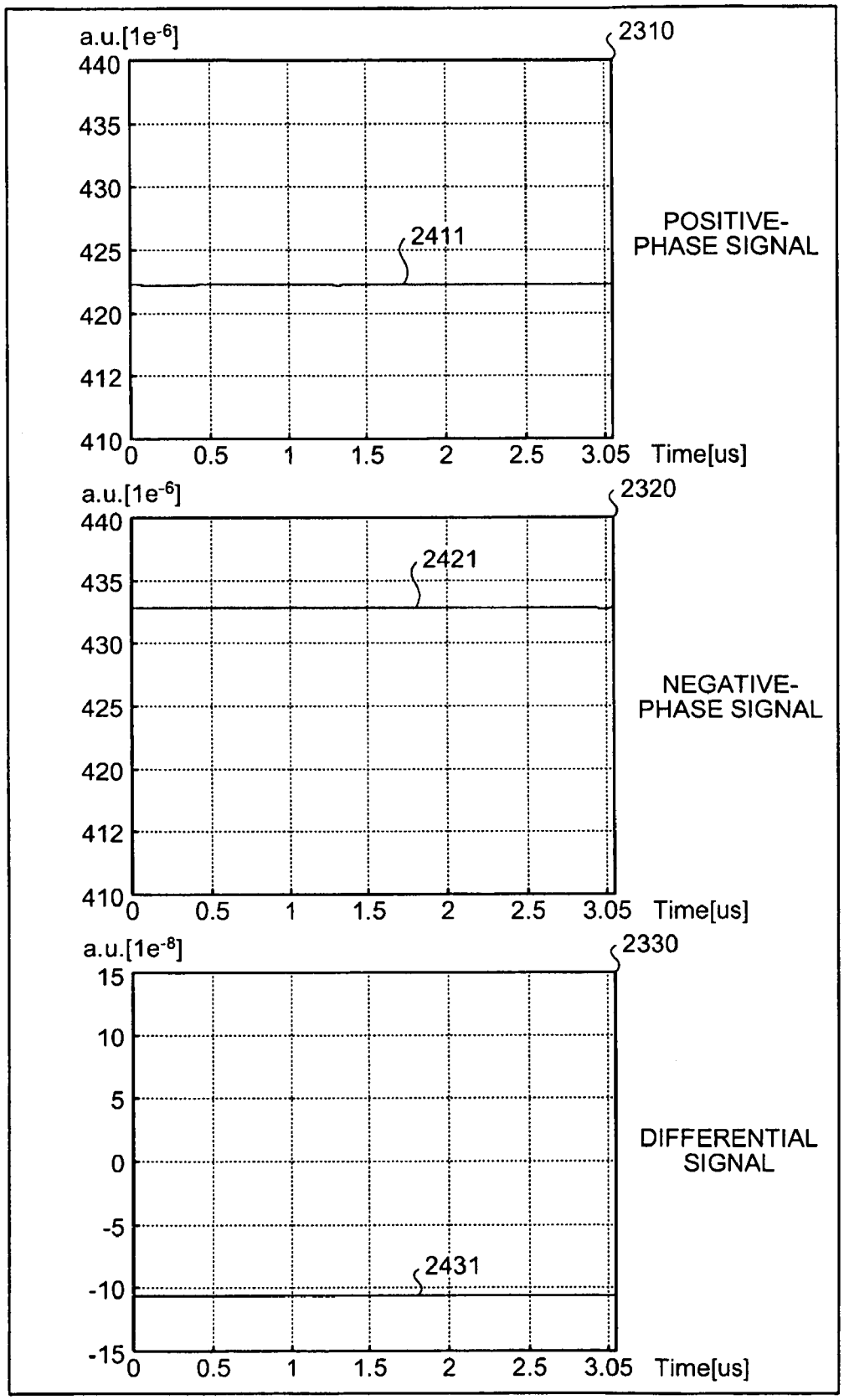
FIG. 24 is a waveform chart of signals when the phase difference deviates −20° from the optimum point.

FIG. 24 is a waveform chart of signals when the phase difference deviates −20° from the optimum point. In FIG. 24, with respect to the same part as depicted in FIG. 23, description thereof will be omitted, with the same reference numeral given thereto. The waveforms of the graphs 2310, 2320, and 2330 of FIG. 24 indicate signals when, with the control signal output by the control unit 163 deviating in the minus direction from the optimum point, the phase difference between the arms of the LN modulator 120 deviates −20° from the optimum point.

In this case, as depicted by the waveform 2411, the power of the positive-phase signal decreases from the state depicted by the waveform 2311 of FIG. 23 and remains constant at about 423 a.u. As depicted by the waveform 2421, the power of the negative-phase signal increases from the state depicted by the waveform 2321 of FIG. 23 and remains constant at about 433 a.u.

Namely, the powers of the positive-phase signal and the negative-phase signal change in opposite directions. Therefore, by detecting the change of the differential signal for the deviation of the phase difference between the arms, and by controlling the output signal of the control unit 163 so that the value comes close to zero, the phase difference at the phase shift unit can be set at the optimum point.

Figure 25:
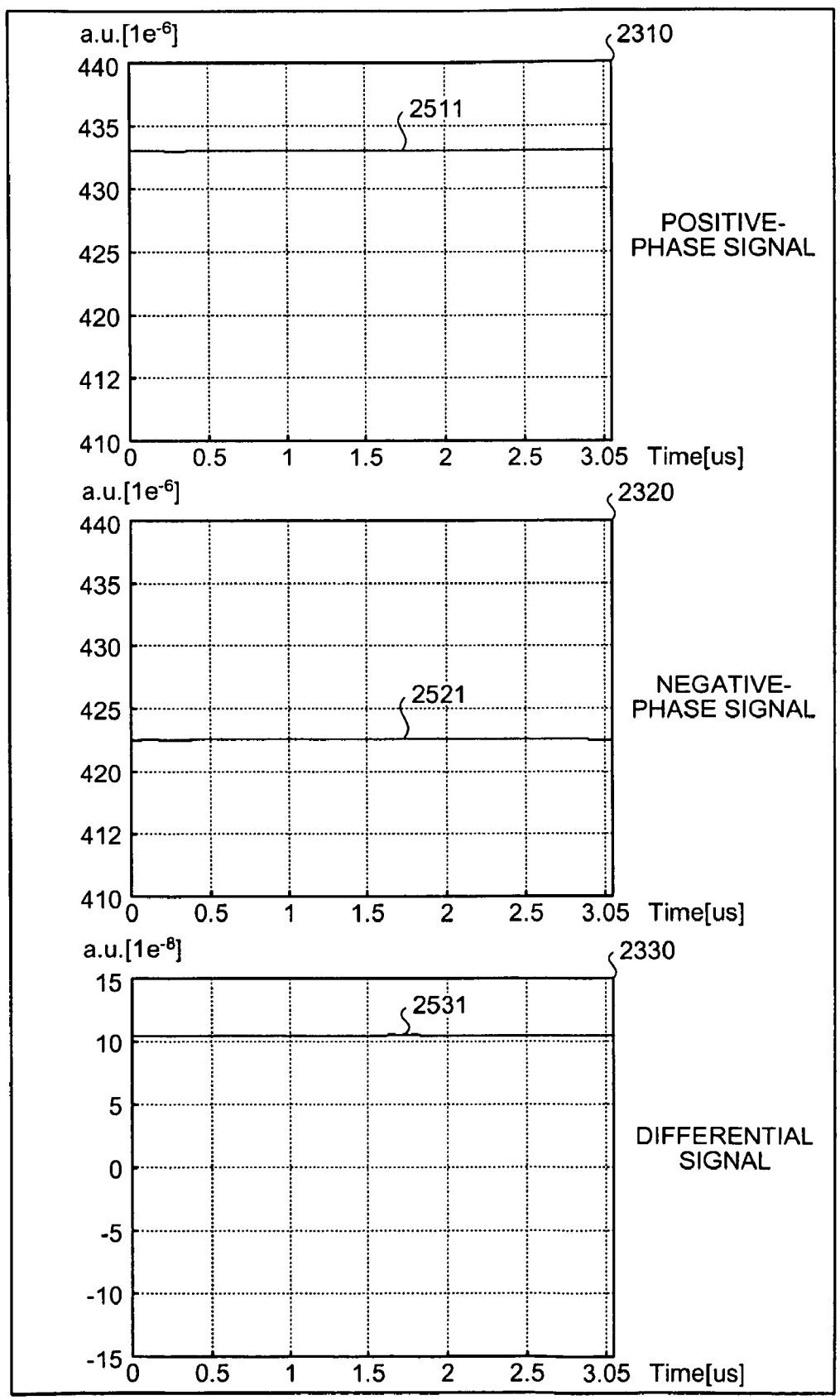
FIG. 25 is a waveform chart of signals when the phase difference deviates +20° from the optimum point.

FIG. 25 is a waveform chart of signals when the phase difference deviates +20° from the optimum point. In FIG. 25, with respect to the same part as depicted in FIG. 23, description thereof will be omitted, with the same reference numeral given thereto. The waveforms of the graphs 2310, 2320, and 2330 of FIG. 25 indicate signals when, with the control signal output by the control unit 163 deviating in the plus direction from the optimum point, the phase difference between the arms of the LN modulator 120 deviates +20° from the optimum point.

In this case, as depicted by the waveform 2511, the power of the positive-phase signal increases from the state depicted by the waveform 2311 of FIG. 23 and remains constant at about 433 a.u. As depicted by the waveform 2521, the power of the negative-phase signal decreases from the state depicted by the waveform 2321 of FIG. 23 and remains constant at about 423 a.u.

Namely, the powers of the positive-phase signal and the negative-phase signal change in opposite directions. Therefore, by detecting the change of the differential signal for the deviation of the phase difference between the arms, and by controlling the output signal of the control unit 163 so that the value comes close to zero, the phase difference at the phase shift unit can be set at the optimum point.

Figure 26:
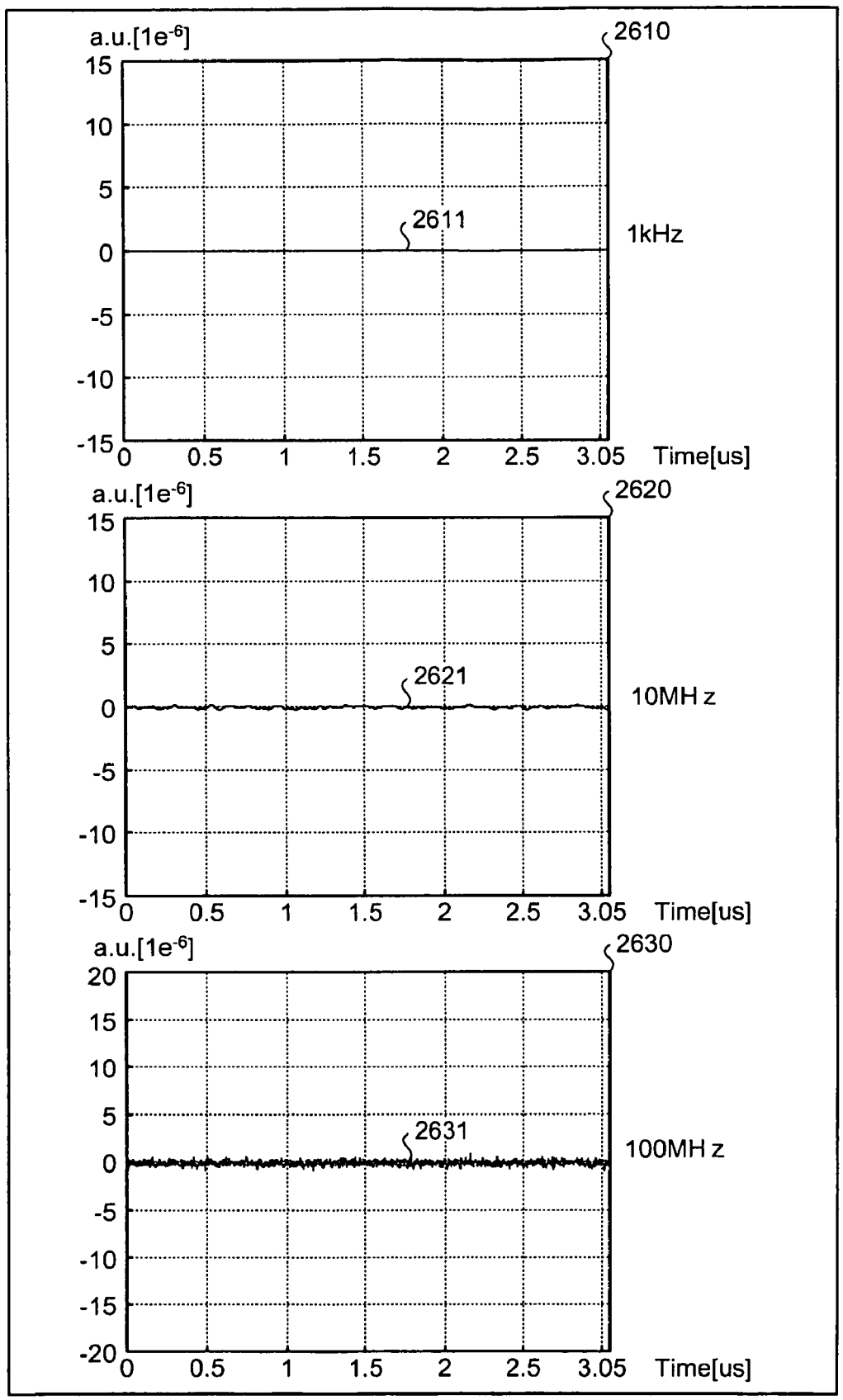
FIG. 26 is a waveform chart of the differential signals in each band when the phase difference is at the optimum point.

FIG. 26 is a waveform chart of the differential signals in each band when the phase difference is at the optimum point. In each of graphs 2610, 2620, and 2630 of FIG. 26, the horizontal axis represents time (Time [us]). The vertical axis represents power (a.u.) of the differential signal output from the subtracting circuit 150 (the same is applicable to FIGS. 27 and 28).

The waveforms of the graphs 2610, 2620, and 2630 indicate signals when, with the control signal output by the control unit 163 being at the optimum point, the phase difference between the arms of the LN modulator 120 is at the optimum point ($\pi/2$). The waveform 2611 of the graph 2610 indicates the waveform in a band from the DC to 1 kHz of the differential signal output from the subtracting circuit 150.

The waveform 2621 of the graph 2620 indicates the waveform in a band from the DC to 10 MHz of the differential signal output from the subtracting circuit 150. The waveform 2631 of the graph 2630 indicates the waveform in a band from the DC to 100 MHz of the differential signal output from the subtracting circuit 150. As depicted by waveforms 2611, 2621, and 2631, in the band up to 100 MHz of the differential signal output from the subtracting circuit 150, the differential signal has larger amplitude, as compared with the differential signal in the band up to 1 kHz and the 10 MHz.

Figure 27:
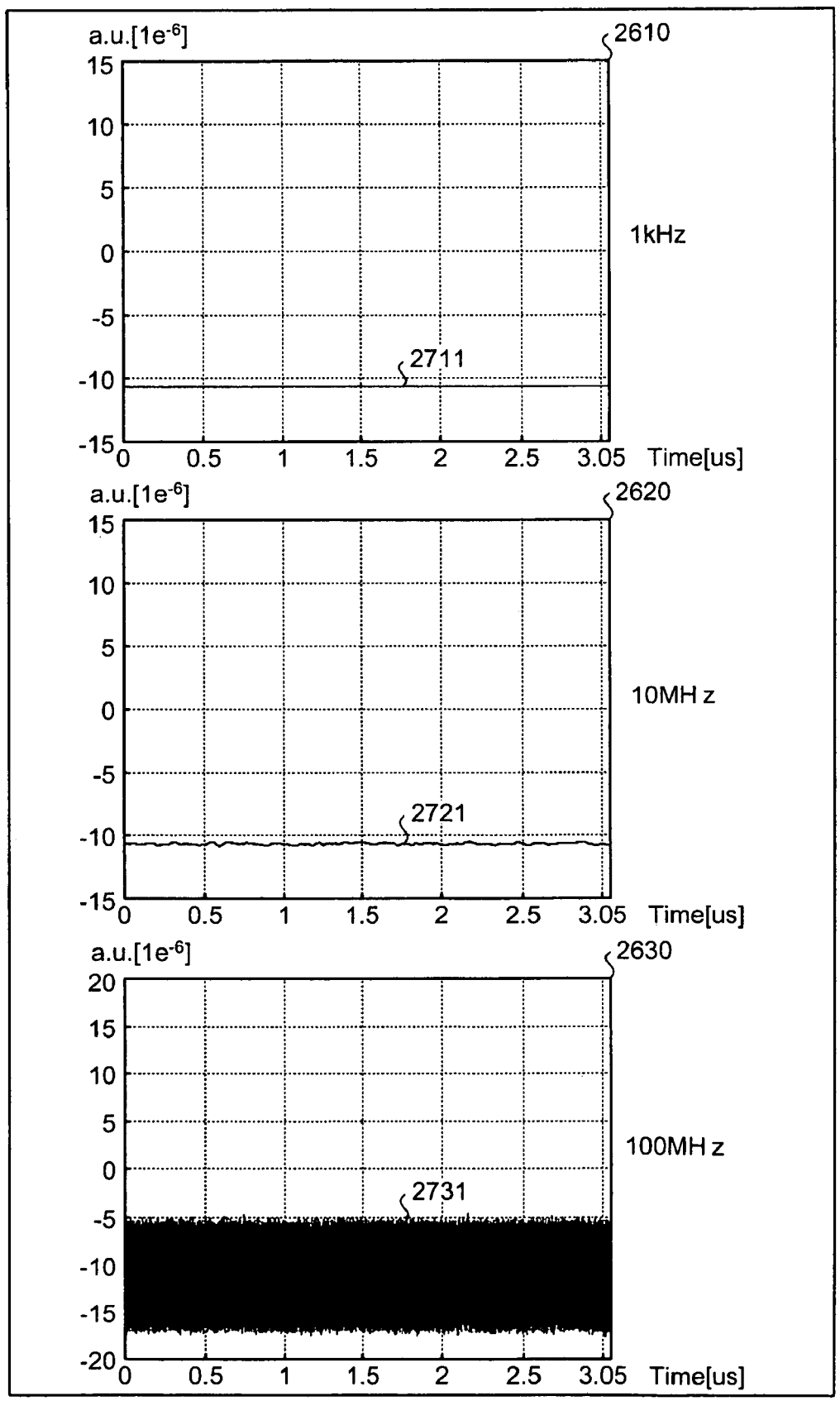
FIG. 27 is a waveform chart of the differential signal in each band when the phase difference deviates −20° from the optimum point.

FIG. 27 is a waveform chart of the differential signal in each band when the phase difference deviates −20° from the optimum point. In FIG. 27, with respect to the same part as depicted in FIG. 26, description thereof will be omitted, with the same reference numeral given thereto. The waveforms of the graphs 2610, 2620, and 2630 of FIG. 27 indicate signals when, with the control signal output by the control unit 163 deviating in the minus direction from the optimum point, the phase difference between the arms of the LN modulator 120 deviates −20° from the optimum point.

The waveform 2711 of the graph 2610 indicates the waveform in the band from the DC to 1 kHz of the differential signal output from the subtracting circuit 150. The waveform 2721 of the graph 2620 indicates the waveform in the band from the DC to 10 MHz of the differential signal output from the subtracting circuit 150. The waveform 2731 of the graph 2630 indicates the waveform in the band from the DC to 100 MHz of the differential signal output from the subtracting circuit 150.

As depicted by the waveform 2731, when the phase difference between the arms of the LN modulator 120 deviates −20° from the optimum point, in the band up to 100 MHz of the differential signal output from the subtracting circuit 150, the differential signal has extremely large amplitude. Therefore, it becomes difficult for the control unit 163 to monitor the change of the differential signal output from the subtracting circuit 150.

Figure 28:
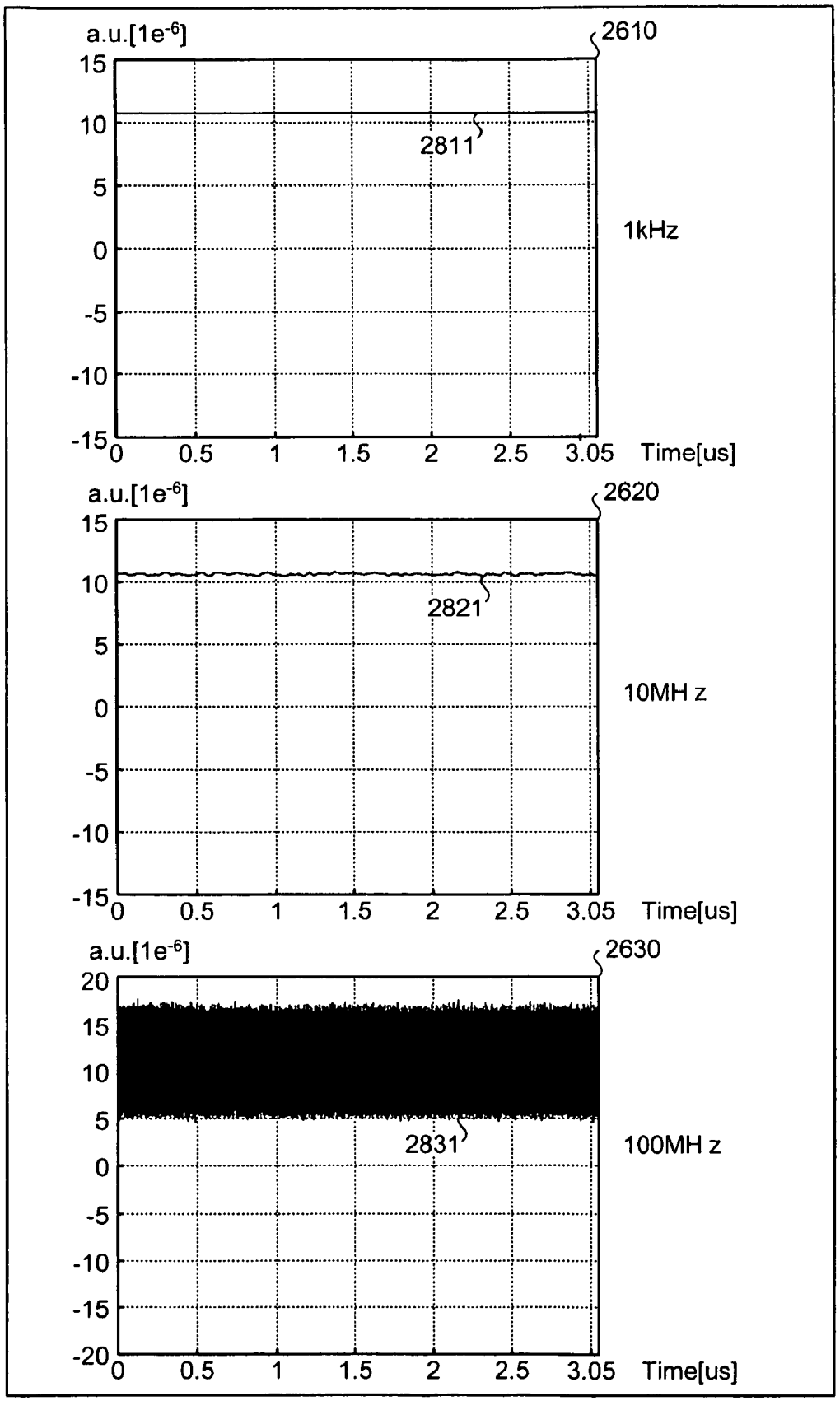
FIG. 28 is a waveform chart of the differential signal in each band when the phase difference deviates +20° from the optimum point.

FIG. 28 is a waveform chart of the differential signal in each band when the phase difference deviates +20° from the optimum point. In FIG. 28, with respect to the same part as depicted in FIG. 26, description thereof will be omitted, with the same reference numeral given thereto. The waveforms of the graphs 2610, 2620, and 2630 of FIG. 28 indicate signals when, with the control signal output by the control unit 163 deviating in the plus direction from the optimum point, the phase difference between the arms of the LN modulator 120 deviates +20° from the optimum point.

The waveform 2811 of the graph 2610 indicates the waveform in the band from the DC to 1 kHz of the differential signal output from the subtracting circuit 150. The waveform 2821 of the graph 2620 indicates the waveform in the band from the DC to 10 MHz of the differential signal output from the subtracting circuit 150. The waveform 2831 of the graph 2630 indicates the waveform in the band from the DC to 100 MHz of the differential signal output from the subtracting circuit 150.

As depicted by the waveform 2831, when the phase difference between the arms of the LN modulator 120 deviates +20° from the optimum point, in the band up to 100 MHz of the differential signal output from the subtracting circuit 150, the differential signal has extremely large amplitude. Therefore, it becomes difficult for the control unit 163 to monitor the change of the differential signal output from the subtracting circuit 150.

As depicted in FIGS. 26 to 28, in the wide band of, for example, above 100 MHz, when the phase difference between the arms of the LN modulator deviates from the optimum point, the amplitude becomes extremely large of the differential signal output from the subtracting circuit 150. Therefore, it is preferable that a pass band in the low pass filter 2211A and the low pass filter 2211B is a low band of, for example, more than several kHz but less than 100 MHz.

Figure 29:
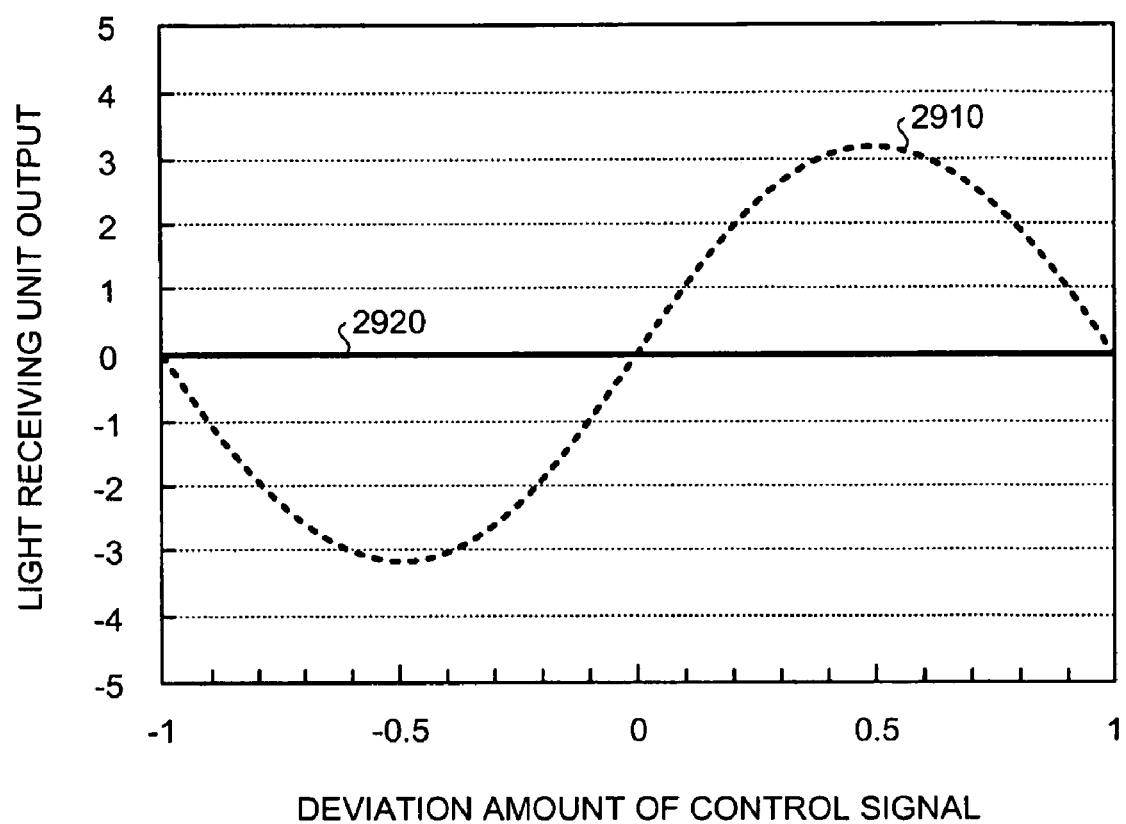
FIG. 29 is a graph of the output of the light receiving unit depicted in FIG. 22.

FIG. 29 is a graph of the output of the light receiving unit depicted in FIG. 22. In FIG. 29, the horizontal axis represents the deviation amount from the optimum point of the control signal output from the control unit 163. The vertical axis represents the power (a.u.) of the positive-phase signal output from the light receiving unit 141A or the power (a.u.) of the negative-phase signal output from the light receiving unit 141B (light receiving unit output).

A dotted line 2910 indicates a relationship between the deviation amount of the control signal and the light receiving unit output in the conventional optical transmitting apparatus (see, e.g., Japanese Patent Application Laid-Open Publication No. 2000-180804). A solid line 2920 indicates the relationship between the deviation amount of the control signal and the light receiving unit output in the optical transmitting apparatus 100 according to the sixth embodiment. As depicted by the dotted line 2910, in the conventional optical transmitting apparatus, as the deviation amount of the control signal changes, the light receiving unit output changes largely.

By contrast, in the optical transmitting apparatus 100 according to the sixth embodiment, even if the deviation amount of the control signal changes, an average power of the light receiving unit output hardly changes. Therefore, in the optical transmitting apparatus 100 according to the sixth embodiment, as described above, it is necessary to extract the positive-phase signal and the negative-phase signal by means of the low pass filter 2211A and the low pass filter 2211B, and use the AC component of the extracted positive-phase signal and negative-phase signal.

As seen above, the optical transmitting apparatus 100 according to the sixth embodiment has the effect of the optical transmitting apparatus 100 according to the first embodiment and, by extracting the low-frequency component of the positive-phase signal and the negative-phase signal by means of the low pass filter 2211A and the low pass filter 2211B, and by changing the control signal based on each extracted component, is capable of detecting the deviation of the phase difference between the arms at high sensitivity at the control unit 163, without performing the synchronous detection.

Accordingly, it is unnecessary to provide the oscillator circuit 162, the adding circuit 164 (see FIG. 1), etc., and a lower cost and space saving of the apparatus can be achieved. Since the deviation of the phase difference between the arms is detected at high sensitivity without performing the synchronous detection, it is not necessary to superimpose the low-frequency signal over the control signal. This enables preventing deterioration of the modulating accuracy due to the superimposing of the low-frequency signal over the control signal and improving the quality of the optical signal to be output.

As described above, according to the disclosed optical transmitting apparatus and control method of the optical transmitting apparatus, the modulating accuracy of the optical signal can be improved.

While, in the above embodiments, the modulation system of the optical transmitting apparatus 100 has been described with respect to the case of using the DQPSK or the RZ-DQPSK, the modulation system is not limited to these cases. The optical transmitting apparatus 100 may be applied to the modulation system in general containing the phase shift unit that controls the phase difference between the arms of the modulating unit to be nπ/2 (n is an arbitrary odd number). For example, the optical transmitting apparatus 100 may be applied to various modulation systems such as SSB modulation, QPSK, and QAM.

As set for the above, the above configuration enables sharpening the change of the monitoring signal for the deviation of the phase difference between the arms and detecting the deviation of the phase difference between the arms with high accuracy, by monitoring the change of a differential signal that represents a difference between the obtained positive-phase signal and negative-phase signal by means of the change of a low-frequency superimposing signal contained in the differential signal.

The disclosed optical transmitting apparatus and control method of the optical transmitting apparatus can maintain the phase difference between optical signals obtained by independently phase-modulating the input optical signal to a predetermined value.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transmitting apparatus comprising:
a modulator that branches an input light and performs independent phase modulation to branched optical signals of arms;
a phase shifter that changes a phase difference between the optical signals of respective arms according to a control signal;
a combiner that combines modulated lights having the phase difference;
a photo diode that acquires a positive-phase signal and a negative-phase signal from the combiner;
a subtracting circuit that obtains a difference between the positive-phase signal and the negative-phase signal acquired by the photo diode;
a power meter that detects a power of a differential signal from subtraction by the subtracting circuit; and
a control circuit that changes the control signal according to signal component intensity detected by the power meter.

2. The optical transmitting apparatus according to claim 1, comprising:
an oscillator circuit that oscillates a low-frequency signal of a frequency lower than a modulating frequency of the optical signals; and
an adding circuit that adds the low-frequency signal oscillated by the oscillator circuit to the control signal input to the phase shifter, wherein
the control circuit changes the control signal based on synchronous detection of the differential signal detected by the power meter and the low-frequency signal.

3. The optical transmitting apparatus according to claim 1, comprising a second modulator connected in series with the modulator, wherein
the photo diode acquires the positive-phase signal modulated by one of the modulator and the second modulator, and the negative-phase signal modulated by the other one of the modulator and the second modulator.

4. The optical transmitting apparatus of claim 3, wherein
the second modulator is an RZ modulator, and
the photo diode acquires the negative-phase signal modulated by the modulator and the positive-phase signal modulated by the second modulator.

5. The optical transmitting apparatus of claim 1, further comprising a filter that extracts a band component below a predetermined frequency of the positive-phase signal and the negative-phase signal acquired by the photo diode, wherein
the subtracting circuit subtracts respective band components of the positive-phase signal and the negative-phase signal extracted by the filter.

6. The optical transmitting apparatus according to claim 1, wherein
the control circuit changes the control signal so that the phase difference comes to nπ/2 where n is an arbitrary odd number.

7. The optical transmitting apparatus according to claim 1, wherein the subtracting circuit is a differential amplifier.

8. The optical transmitting apparatus according to claim 1, wherein the modulator is a modulator that performs phase modulation.

9. An optical transmitting apparatus comprising:
a modulator that branches an input light and performs independent phase modulation to branched optical signals of arms;
a phase shifter that changes a phase difference between the optical signals of respective arms according to a control signal;
a combiner that combines modulated lights having the phase difference;
a photo diode that acquires a positive-phase signal and a negative-phase signal from the combiner;
a multiplying circuit that obtains a product of the positive-phase signal and the negative-phase signal acquired by the photo diode;
a power meter detecting a power of a product signal from multiplication by the multiplying circuit; and
a control circuit that changes the control signal according to signal component intensity detected by the power meter.

10. A control method of an optical transmitting apparatus comprising:
branching an input light and performing independent phase modulation to branched optical signals of arms;

changing a phase difference between the optical signals of respective arms according to a control signal;
combining modulated lights having the phase difference;
acquiring a positive-phase signal and a negative-phase signal;
obtaining a difference between the positive-phase signal and the negative-phase signal;
detecting a power of a differential signal from subtraction; and
changing the control signal according to signal component power detected by the power meter.

* * * * *